US012419485B2

(12) United States Patent
McGinness et al.

(10) Patent No.: US 12,419,485 B2
(45) Date of Patent: Sep. 23, 2025

(54) AUTOMATED CLEANING MACHINE PROCESSING USING SHORTENED CYCLE TIMES

(71) Applicant: Ecolab USA Inc., St. Paul, MN (US)

(72) Inventors: Rachel Marie McGinness, Rosemount, MN (US); Jonathan Charles Butwinick, Apple Valley, MN (US); Paul R. Kraus, Apple Valley, MN (US); Alissa R. Ellingson, Woodbury, MN (US); Conor Sylvester Smith, Saint Louis Park, MN (US); Paul Dominic Christian, Apple Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 18/398,859

(22) Filed: Dec. 28, 2023

(65) Prior Publication Data

US 2024/0122437 A1 Apr. 18, 2024

Related U.S. Application Data

(63) Continuation of application No. 17/193,189, filed on Mar. 5, 2021, now Pat. No. 11,889,963.

(Continued)

(51) Int. Cl.
*A47L 15/42* (2006.01)
*A47L 15/00* (2006.01)

(Continued)

(52) U.S. Cl.
CPC ....... *A47L 15/0044* (2013.01); *A47L 15/0026* (2013.01); *A47L 15/0028* (2013.01);

(Continued)

(58) Field of Classification Search
None
See application file for complete search history.

(56) References Cited

U.S. PATENT DOCUMENTS

| | | | |
|---|---|---|---|
| D227,117 S | 6/1973 | Breger | |
| 4,735,219 A | 4/1988 | Seeland | |

(Continued)

FOREIGN PATENT DOCUMENTS

| | | |
|---|---|---|
| CA | 2541480 A1 | 9/2006 |
| CN | 1197137 A | 10/1998 |

(Continued)

OTHER PUBLICATIONS

Translation of CN110367898 by Liang, published Oct. 25, 2019.*

(Continued)

*Primary Examiner* — Kaj K Olsen
*Assistant Examiner* — Ryan L Coleman
(74) *Attorney, Agent, or Firm* — Shumaker & Sieffert, P.A.

(57) ABSTRACT

An automated cleaning machine may include one or more short cleaning cycles in which the duration of a cleaning cycle is shortened relative to the duration of a default cleaning cycle. During a short cleaning cycle, other cleaning cycle parameters may also be adjusted to ensure that the articles subjected to the short cleaning cycle are adequately cleaned and sanitized. For example, the wash temperature, rinse temperature, and/or cleaning product amounts or concentrations, may be adjusted to account for the shortened duration of the cleaning cycle. The automated cleaning machine may further include one or more short cycle mode(s) during which short cleaning cycle parameters are used and one or more default cycle mode(s) during which default cleaning cycle parameters are used.

12 Claims, 19 Drawing Sheets

Related U.S. Application Data

(60) Provisional application No. 63/031,990, filed on May 29, 2020.

(51) Int. Cl.
*A47L 15/44* (2006.01)
*B08B 3/04* (2006.01)
*D06F 33/44* (2020.01)
*D06F 33/70* (2020.01)
*A47L 15/46* (2006.01)

(52) U.S. Cl.
CPC ......... *A47L 15/0034* (2013.01); *A47L 15/449* (2013.01); *B08B 3/04* (2013.01); *D06F 33/44* (2020.02); *D06F 33/70* (2020.02); *A47L 15/46* (2013.01); *A47L 2401/03* (2013.01); *A47L 2501/01* (2013.01); *A47L 2501/06* (2013.01); *A47L 2501/07* (2013.01)

(56) References Cited

U.S. PATENT DOCUMENTS

| | | | |
|---|---|---|---|
| D427,315 | S | 6/2000 | Saltzstein et al. |
| 6,463,940 | B1 | 10/2002 | Thomas et al. |
| 6,615,850 | B1 | 9/2003 | Hornung |
| 6,622,754 | B1 | 9/2003 | Roth et al. |
| 7,437,213 | B2 | 10/2008 | Batcher |
| D605,588 | S | 12/2009 | Nomi et al. |
| D677,669 | S | 3/2013 | Liu |
| D699,246 | S | 2/2014 | Ringlein |
| D715,284 | S | 10/2014 | Iwamoto |
| 9,041,985 | B2 | 5/2015 | Kasahara et al. |
| D730,886 | S | 6/2015 | Tseng |
| 9,289,107 | B2 | 3/2016 | Ellingson et al. |
| 9,329,159 | B2 | 5/2016 | Walicki |
| D768,138 | S | 10/2016 | Malsan |
| 9,473,653 | B2 | 10/2016 | Hayashi |
| D788,778 | S | 6/2017 | Magi et al. |
| D795,323 | S | 8/2017 | Melamed et al. |
| D808,947 | S | 1/2018 | Taniho et al. |
| D837,180 | S | 1/2019 | Silva |
| 10,514,339 | B2 | 12/2019 | Chen et al. |
| D872,072 | S | 1/2020 | Anderson |
| 10,529,219 | B2 | 1/2020 | Herdt et al. |
| 10,762,617 | B2 | 9/2020 | Sanders et al. |
| 11,627,861 | B2 | 4/2023 | Smith et al. |
| 11,666,198 | B2 | 6/2023 | Han et al. |
| 11,889,963 | B2 | 2/2024 | McGinness et al. |
| 2005/0201898 | A1 | 9/2005 | Borich et al. |
| 2006/0222567 | A1 | 10/2006 | Kloepfer et al. |
| 2007/0181162 | A1 | 8/2007 | Classen et al. |
| 2008/0267445 | A1 | 10/2008 | Capewell |
| 2009/0151751 | A1 | 6/2009 | Bragg |
| 2010/0205819 | A1 | 8/2010 | Ashrafzadeh et al. |
| 2011/0108073 | A1 | 5/2011 | Tameishi |
| 2011/0209729 | A1 | 9/2011 | Beaudet et al. |
| 2011/0240061 | A1 | 10/2011 | Cantrell et al. |
| 2011/0291830 | A1 | 12/2011 | Kaiser |
| 2011/0320133 | A1 | 12/2011 | Mehus et al. |
| 2012/0138092 | A1 | 6/2012 | Ashrafzadeh et al. |
| 2014/0041688 | A1 | 2/2014 | Maennle et al. |
| 2014/0041695 | A1 | 2/2014 | Ellingson et al. |
| 2014/0218385 | A1 | 8/2014 | Carmi |
| 2015/0233898 | A1 | 8/2015 | Chen et al. |
| 2016/0171690 | A1 | 6/2016 | Adiri et al. |
| 2017/0023542 | A1 | 1/2017 | Wang et al. |
| 2017/0119229 | A1 | 5/2017 | Montgomery et al. |
| 2017/0119232 | A1 | 5/2017 | Ugel et al. |
| 2018/0330338 | A1 | 11/2018 | Holden et al. |
| 2019/0244375 | A1 | 8/2019 | Choi et al. |
| 2019/0261828 | A1 | 8/2019 | Gaus et al. |
| 2019/0298143 | A1* | 10/2019 | Haidacher ........... A47L 15/0034 |
| 2019/0365197 | A1 | 12/2019 | Maddux |
| 2020/0301382 | A1 | 9/2020 | Fawaz et al. |
| 2020/0397216 | A1 | 12/2020 | Fawaz et al. |
| 2021/0019874 | A1 | 1/2021 | Sanders et al. |
| 2021/0076898 | A1 | 3/2021 | Smith et al. |
| 2021/0127939 | A1 | 5/2021 | Hofmann et al. |
| 2021/0161355 | A1 | 6/2021 | Rahn et al. |
| 2021/0324561 | A1 | 10/2021 | Kim et al. |
| 2021/0369076 | A1 | 12/2021 | McGinness et al. |
| 2022/0095879 | A1 | 3/2022 | Ellingson |
| 2022/0104680 | A1 | 4/2022 | Han et al. |
| 2023/0218137 | A1 | 7/2023 | Smith et al. |
| 2023/0337891 | A1 | 10/2023 | Han et al. |

FOREIGN PATENT DOCUMENTS

| | | | |
|---|---|---|---|
| CN | 101961237 | A | 2/2011 |
| CN | 102933322 | A | 2/2013 |
| CN | 106923767 | A | 7/2017 |
| CN | 107485356 | A | 12/2017 |
| CN | 107729816 | A | 2/2018 |
| CN | 104668252 | B | 1/2019 |
| CN | 110367898 | * | 10/2019 |
| CN | 110367898 | A | 10/2019 |
| CN | 107421918 | B | 12/2019 |
| CN | 111870205 | A | 11/2020 |
| DE | 102005033345 | A1 | 1/2007 |
| DE | 102008042290 | A1 | 3/2010 |
| DE | 102010033016 | A1 | 2/2012 |
| DE | 102018108775 | A1 | 10/2019 |
| EP | 0341766 | A2 | 11/1989 |
| EP | 1272093 | A2 | 1/2003 |
| EP | 1690924 | A1 | 8/2006 |
| EP | 1887443 | A1 | 2/2008 |
| EP | 2497404 | A1 | 9/2012 |
| EP | 3088593 | A1 | 11/2016 |
| JP | 61280838 | A | 12/1986 |
| JP | 02274289 | A | 11/1990 |
| JP | 05115418 | A | 5/1993 |
| JP | 0663279 | A | 3/1994 |
| JP | 2000316783 | A | 11/2000 |
| JP | 2002336335 | A | 11/2002 |
| JP | 2003038888 | A | 2/2003 |
| JP | 2003506153 | A | 2/2003 |
| JP | 2004261439 | A | 9/2004 |
| JP | 2005342143 | A | 12/2005 |
| JP | 2009056030 | A | 3/2009 |
| JP | 2009075084 | A | 4/2009 |
| JP | 2010036023 | A | 2/2010 |
| JP | 2015008914 | A | 1/2015 |
| JP | 2015504708 | A | 2/2015 |
| JP | 2016193169 | A | 11/2016 |
| JP | 2018068862 | A | 5/2018 |
| JP | 2018524107 | A | 8/2018 |
| KR | 102019102134 | A | 8/2019 |
| KR | 102119076 | B1 | 6/2020 |
| WO | 9930843 | A1 | 6/1999 |
| WO | 0110472 | A1 | 2/2001 |
| WO | 0178573 | A2 | 10/2001 |
| WO | 0213136 | A2 | 2/2002 |
| WO | 2006002123 | A1 | 1/2006 |
| WO | 2006097294 | A1 | 9/2006 |
| WO | 2007081004 | A1 | 7/2007 |
| WO | 2010118124 | A2 | 10/2010 |
| WO | 2011048575 | A2 | 4/2011 |
| WO | 2011089094 | A1 | 7/2011 |
| WO | 2013090443 | A1 | 6/2013 |
| WO | 2014137540 | A1 | 9/2014 |
| WO | 2015036311 | A1 | 3/2015 |
| WO | 2015080965 | A1 | 6/2015 |
| WO | 2015127547 | A1 | 9/2015 |
| WO | 2015167574 | A1 | 11/2015 |
| WO | 2017013615 | A1 | 1/2017 |
| WO | 2017056002 | A1 | 4/2017 |

OTHER PUBLICATIONS

Office Action from Japanese Patent Application No. 2022-573330 dated 2025, 8 pages.*

Response to Office Action dated May 7, 2024, from counterpart Japanese Application No. 2022-573330 filed Oct. 28, 2024, 16 pp.

(56) References Cited

OTHER PUBLICATIONS

Translation of JPH0663279 by loku, published Mar. 8, 1994, JPH0663279 Previously Cited.
Advisory Action from U.S. Appl. No. 17/193,314 dated Jun. 27, 2024, 3 pp.
Notice of Allowance from U.S. Appl. No. 17/108,894, dated Jun. 27, 2024, 7 pp.
Office Action from counterpart Japanese Application No. 2022-573330 dated May 7, 2024, 11 pp.
Response to Final Office Action dated Mar. 27, 2024 from U.S. Appl. No. 17/193,314, filed Jul. 12, 2024, 12 pp.
Response to Final Office Action dated Mar. 27, 2024 from U.S. Appl. No. 17/193,314, filed May 24, 2024, 10 pp.
Response to Office Action dated Apr. 26, 2024 from U.S. Patent Application No. 18/185, 194 filed Jul. 22, 2024, p. 16.
"CDWA Cleaning Indicator—Cleaning Performance Test," Terragene, retrieved on Feb. 13, 2019, from https://fontlab2000.com/sites/default/files/cdwa-rev.15.pdf, 2 pp.
"NSF/ANSI 3—2017-Commercial Warewashing Equipment," NSF International, ANSI Standard, Apr. 11, 2017, 42 pp.
"Two-Class Logistic Regression," retrieved from https://docs.microsoft.com/en-us/azure/machine-learning/studio-module-reference/two-class-logistic-regression, May 6, 2019, 7 pp.
Powered for iPhone: Wireless Charging Stand for iPhone 8 and Above, Logitech POWERED iPhone Wireless Charging Standard, retrieved from https://www.logitech.com/en-us/productlpowered-iphone-wireless-charging?crid=1537 on Mar. 4, 2019, 10 pp.
Brownlee, "A Tour of Machine Learning Algorithms," machinelearningmastery.com, Aug. 14, 2020, 11 pp.
International Preliminary Report on Patentability from International Application No. PCT/US2021/021036 dated Dec. 8, 2022, 11 pp.
International Search Report and Written Opinion of International Application No. PCT/US2021/021036, mailed Jun. 2, 2021, 15 pp.
Kumar et al., "A Detailed Review of Feature Extraction in Image Processing Systems," 2014 Fourth International Conference on Advanced Computing & Communication Technologies, Feb. 8, 2014, 8 pp.
Machine Translation of CN 107729816 by Shan et al., published Feb. 23, 2018.
Narkhede, "Understanding AUC—ROC Curve," towardsdatascience.com, Jun. 26, 2018, 7 pp.
Narkhede, "Understanding Confusion Matrix," towardsdatascience.com, May 9, 2018, 6 pp.
Patel, "Machine Learning Algorithm Overview," medium.com, Jul. 21, 2018, 10 pp.
Prosecution History from U.S. Appl. No. 17/018,363, dated Dec. 16, 2021 through Mar. 16, 2023, 72 pp.
Prosecution History from U.S. Appl. No. 17/108,894, dated Jan. 12, 2021 through Mar. 21, 2024, 94 pp.
Prosecution History from U.S. Appl. No. 17/193,189, dated May 19, 2022 through Sep. 27, 2023, 125 pp.
Prosecution History from U.S. Appl. No. 17/193,314, dated Apr. 12, 2023 through Dec. 13, 2023, 43 pp.
Prosecution History from U.S. Appl. No. 17/193,507, dated Oct. 21, 2022 through Apr. 28, 2023, 39 pp.
Response to Communication Pursuant to Rules 161(1) and 162 EPC dated Jan. 11, 2023, from counterpart European Application No. 21715368.3, filed Jul. 13, 2023, 19 pp.
Saslow, "Collinearity-What it Means, Why its Bad, and How Does it Affect Other Models," medium.com, Jul. 11, 2018, 5 pp.
Shung, "Accuracy, Precision, Recall or F1?," towardsdatascience.com, Mar. 15, 2018, 7 pp.
Singh, "Model-Based Feature Importance," towardsdatascience.com, Jan. 3, 2019, 7 pp.
YouTube, "Regularization Part 1: Ridge (L2) Regression," retrieved from https://www.youtube.com/watch?app=desktop&v=Q81RR3yKn30&t=3s, Sep. 24, 2018, 1 pp.
YouTube, "Regularization Part 2: Lasso (L1) Regression," Retrieved from https://www.youtube.com/watch?app=desktop&v=NGfOvoTMIcs, Oct. 1, 2018, 1 pp.
Notice of Allowance from U.S. Appl. No. 17/108,894 dated Aug. 16, 2024, 5 pp.
Notice of Allowance from U.S. Appl. No. 17/108,894, dated Sep. 27, 2024, 5 pp.
Notice of Allowance from U.S. Appl. No. 17/193,314 dated Sep. 11, 2024, 10 pp.
Final Office Action from U.S. Appl. No. 17/193,314 dated Mar. 27, 2024, 19 pp.
Office Action from U.S. Appl. No. 18/185,194 dated Apr. 26, 2024, 18 pp.
Response to Office Action dated Dec. 21, 2023 from U.S. Appl. No. 17/108,894, filed Mar. 21, 2024, 16 pp.
First Office Action and Search Report, and translation thereof, from counterpart Chinese Application No. 2021800345255 dated Feb. 24, 2025, 9 pp.
Notice of Allowance from U.S. Appl. No. 18/307,380 dated Mar. 26, 2025, 8 pp.
Response to Office Action dated Feb. 4, 2025, from counterpart Japanese Application No. 2022-573330 filed Apr. 9, 2025, 4 pp. Translation Attached.
Notice of Allowance from U.S. Appl. No. 18/307,380 dated Jul. 8, 2025, 8 pp.
Notice of Intent to Grant and Text Intended to Grant from counterpart European Application No. 21715368.3 dated Jul. 25, 2025, 135 pp.
Office Action from counterpart Japanese Application No. 2022-573330 dated Jul. 29, 2025, 5 pp. Translation Attached.
Second Office Action from counterpart Chinese Application No. 202180034525.5 dated Jul. 29, 2025, 32 pp. Translation Attached.

* cited by examiner

| Experiment Number | Detergent Concentration | Water Hardness (gpg) | Wash Temp (F) | Rinse Temp (F) | Total Cycle Time (sec) | Cleaning Time (sec) | HUEs Accumulated |
|---|---|---|---|---|---|---|---|
| 1 | medium | 11 | 150 | 155 | 52 | >52 | 150.3 |
| 2 | low | 5 | 120 | 190 | 42 | >42 | 1667.3 |
| 3 | high | 17 | 180 | 190 | 77 | 12 | 25599.7 |
| 4 | high | 17 | 120 | 190 | 42 | >42 | 443.3 |
| 5 | high | 5 | 120 | 190 | 77 | 34 | 801.9 |
| 6 | high | 17 | 180 | 120 | 62 | 22 | 16833 |
| 7 | low | 5 | 180 | 190 | 77 | >77 | 26629.3 |
| 8 | high | 17 | 180 | 120 | 42 | >42 | 546.1 |
| 9 | high | 5 | 120 | 120 | 62 | 37 | 0 |
| 10 | high | 5 | 180 | 120 | 77 | 13 | 22372.3 |
| 11 | high | 17 | 120 | 120 | 77 | >77 | 0 |
| 12 | low | 17 | 180 | 120 | 27 | >27 | 6105.6 |
| 13 | low | 17 | 180 | 190 | 42 | >42 | 13831.5 |
| 14 | low | 17 | 120 | 120 | 42 | >42 | 0 |
| 15 | low | 5 | 120 | 120 | 27 | >27 | 0 |
| 16 | high | 5 | 180 | 120 | 27 | 15 | 7679.5 |
| 17 | low | 17 | 180 | 120 | 77 | >77 | 18637.3 |
| 18 | low | 17 | 120 | 190 | 27 | >27 | 1.96 |
| 19 | low | 5 | 180 | 120 | 62 | >62 | 21719.6 |
| 20 | medium | 11 | 150 | 155 | 52 | >52 | 51.9 |
| 21 | low | 17 | 120 | 120 | 62 | >62 | 0 |
| 22 | high | 5 | 180 | 190 | 42 | 19 | 15099.8 |
| 23 | high | 5 | 180 | 190 | 62 | 15 | 22013.1 |
| 24 | high | 17 | 120 | 190 | 62 | >62 | 0 |
| 25 | high | 5 | 120 | 190 | 27 | >27 | 16.5 |
| 26 | high | 5 | 120 | 120 | 42 | >42 | 2 |
| 27 | low | 5 | 180 | 120 | 42 | >42 | 8495.5 |
| 28 | low | 5 | 120 | 120 | 77 | >77 | 6.4 |
| 29 | low | 5 | 120 | 190 | 62 | >62 | 9.1 |
| 30 | high | 17 | 180 | 190 | 27 | >27 | 7997.9 |
| 31 | medium | 11 | 150 | 155 | 52 | >52 | 56.3 |
| 32 | low | 17 | 120 | 190 | 77 | >77 | 477.97 |
| 33 | medium | 11 | 150 | 155 | 52 | >52 | 75.3 |
| 34 | high | 17 | 120 | 120 | 27 | >27 | 0 |
| 35 | low | 5 | 180 | 190 | 27 | >27 | 11864.5 |
| 36 | low | 17 | 180 | 190 | 62 | >62 | 21097.4 |

FIG. 9

AUTOMATED CLEANING MACHINE PROCESSING USING SHORTENED CYCLE TIMES

This application is a continuation of U.S. patent application Ser. No. 17/193,189, filed Mar. 5, 2021, which claims the benefit of U.S. Provisional Application No. 63/031,990, titled, "AUTOMATED CLEANING MACHINE PROCESSING USING SHORTENED CYCLE TIMES", filed May 29, 2020, the entire content of each of which is incorporated herein by reference.

BACKGROUND

Automated cleaning machines are used in restaurants, healthcare facilities, and other locations to clean, disinfect, and/or sanitize various articles. In a restaurant or food processing facility, automated cleaning machines (e.g., ware wash machines or dish machines) may be used to clean food preparation and eating articles, such as dishware, glassware, pots, pans, utensils, food processing equipment, and other items. In general, articles to be cleaned are placed on a rack and provided to a wash chamber of the automated cleaning machine. In the chamber, one or more cleaning products and/or rinse agents are applied to the articles during a cleaning process. The cleaning process may include one or more wash phases and one or more rinse phases. At the end of the cleaning process, the rack is removed from the wash chamber. Water temperature, water pressure, water quality, concentration of the chemical cleaning and/or rinse agents, duration of the wash and/or rinse phases and other factors may impact the efficacy of a cleaning process.

SUMMARY

In general, the disclosure is directed to systems and/or methods of automated cleaning machine processing using shortened cycle times. For example, the systems and/or methods in accordance with the present disclosure may include automated cleaning machines having one or more "short" cleaning cycles that effectively clean and sanitize items in a shortened time period. The short cleaning cycles may include other short cycle parameters to ensure items are cleaned and sanitized in a shortened time period as compared to default or normal machine cycle settings. The short cleaning cycles of the present disclosure may be used to increase throughput of an automated cleaning machine while ensuring satisfactory cleaning and/or sanitizing results.

In one example, the disclosure is directed to an automated cleaning machine comprising at least one processor; at least one storage device that stores default cleaning cycle parameters and short cleaning cycle parameters, wherein the short cleaning cycle parameters include a total cycle duration that is relatively less than a total cycle duration of the default cleaning cycle; the at least one storage device further comprising instructions executable by the at least one processor to: control execution by the cleaning machine of at least one cleaning cycle using the default cleaning cycle parameters; determine a number of cleaning cycles executed during a predetermined period of time; compare the determined number of cleaning cycles to a predetermined short cycle threshold; in response to the determined number of cleaning cycles being greater than the predetermined short cycle threshold, control execution of at least one subsequent cleaning cycle using the short cycle cleaning process parameters.

The one or more default cleaning cycle parameters may include at least one of a default wash phase duration, a default rinse phase duration, a default detergent concentration, a default wash water temperature and a default rinse water temperature, the one or more short cleaning cycle parameters may include at least one of a short cycle wash phase duration, a short cycle rinse phase duration, a short cycle detergent concentration, a short cycle wash water temperature and a short cycle rinse water temperature, and the short cycle wash water temperature may be relatively higher than the default wash water temperature.

The short cycle detergent concentration may be relatively higher than the default detergent concentration. The short cycle rinse water temperature may be relatively higher than the default rinse water temperature. The short cycle wash phase duration may be relatively less than the default wash phase duration.

The short cycle wash phase duration and the short cycle wash water temperature may be sufficient to transfer at least 3600 Heat Unit Equivalents (HUEs) to the articles in the wash chamber of the automated cleaning machine.

The short cycle detergent concentration may be relatively higher than the default detergent concentration, and the short cycle wash phase duration, the short cycle wash water temperature, and the short cycle detergent concentration may be sufficient to effectively clean the articles in the wash chamber of the automated cleaning machine.

The at least one storage device further may comprise instructions executable by the at least one processor to control execution of one or more cleaning cycles in the wash chamber of the cleaning machine in either a default cycle mode or a short cycle mode; in default cycle mode, control execution of at least one cleaning cycle in the wash chamber of the cleaning machine using the default cleaning cycle parameters; and in short cycle mode, control execution of at least one cleaning cycle in the wash chamber of the cleaning machine using the short cleaning cycle parameters. The at least one storage device may further comprise instructions executable by the at least one processor to: in response to the determined number of cleaning cycles being less than the predetermined short cycle threshold, control execution of at least one subsequent cleaning cycle using the default cycle cleaning process parameters.

In another example, the disclosure is directed to an automated cleaning machine comprising a wash chamber configured to receive one or more articles to be cleaned; a controller that controls execution of one or more cleaning cycles in the wash chamber of the cleaning machine in one of a default cycle mode or a short cycle mode, the controller comprising: at least one processor; at least one storage device that stores default cleaning cycle parameters associated with the default cycle mode and short cleaning cycle parameters associated with the short cycle mode, wherein the short cleaning cycle parameters include a total cycle duration that is less than a total cycle duration of the default cleaning cycle; the at least one storage device further comprising instructions executable by the at least one processor to: control execution by the cleaning machine of at least one cleaning cycle in default cycle mode using the default cleaning cycle parameters; determine a number of cleaning cycles executed during a predetermined period of time; compare the determined number of cleaning cycles to a predetermined short cycle threshold; in response to the determined number of cleaning cycles being greater than the predetermined short cycle threshold, control execution of at least one subsequent cleaning cycle in short cycle mode using the short cycle cleaning process parameters.

In another example, the disclosure is directed to an automated cleaning machine comprising at least one processor; at least one storage device that stores default cleaning cycle parameters and short cleaning cycle parameters, wherein the short cleaning cycle parameters include a total cycle duration that is relatively less than a total cycle duration of the default cleaning cycle; the at least one storage device further comprising instructions executable by the at least one processor to: control execution by the cleaning machine of at least one cleaning cycle using the default cleaning cycle parameters; determine whether a current time of day is within a predetermined short cycle time period; in response to determining that the current time of day is within the predetermined short cycle time period, control execution of at least one subsequent cleaning cycle using the short cycle cleaning process parameters.

The at least one storage device may further comprise instructions executable by the at least one processor to: determine a number of cleaning cycles executed using the short cleaning process parameters during a predetermined period of time; compare the determined number of cleaning cycles to a predetermined short cycle threshold in response to the determined number of cleaning cycles being less than the predetermined short cycle threshold, control execution of at least one subsequent cleaning cycle using the default cycle cleaning process parameters.

The one or more default cleaning cycle parameters may include at least one of a default wash phase duration, a default rinse phase duration, a default detergent concentration, a default wash water temperature and a default rinse water temperature, the one or more short cleaning cycle parameters may include at least one of a short cycle wash phase duration, a short cycle rinse phase duration, a short cycle detergent concentration, a short cycle wash water temperature and a short cycle rinse water temperature, and the short cycle wash water temperature may be relatively higher than the default wash water temperature.

The short cycle detergent concentration may be relatively higher than the default detergent concentration. The short cycle rinse water temperature may be relatively higher than the default rinse water temperature. The short cycle wash phase duration may be relatively less than the default wash phase duration.

The short cycle wash phase duration and the short cycle wash water temperature may be sufficient to transfer at least 3600 Heat Unit Equivalents (HUEs) to the articles in the wash chamber of the automated cleaning machine.

The short cycle detergent concentration may be relatively higher than the default detergent concentration, and the short cycle wash phase duration, the short cycle wash water temperature, and the short cycle detergent concentration may be sufficient to effectively clean the articles in the wash chamber of the automated cleaning machine.

In another example, the disclosure is directed to a method comprising storing default cleaning cycle parameters and short cleaning cycle parameters, wherein the short cleaning cycle parameters include a total cycle duration that is relatively less than a total cycle duration of the default cleaning cycle; controlling execution by a cleaning machine of at least one cleaning cycle using the default cleaning cycle parameters; determining a number of cleaning cycles executed during a predetermined period of time; comparing the determined number of cleaning cycles to a predetermined short cycle threshold; and in response to the determined number of cleaning cycles being greater than the predetermined short cycle threshold, controlling execution by the cleaning machine of at least one subsequent cleaning cycle using the short cycle cleaning process parameters.

In another example, the disclosure is directed to a method comprising: storing default cleaning cycle parameters and short cleaning cycle parameters, wherein the short cleaning cycle parameters include a total cycle duration that is relatively less than a total cycle duration of the default cleaning cycle; controlling execution by a cleaning machine of at least one cleaning cycle using the default cleaning cycle parameters; determining whether a current time of day is within a predetermined short cycle time period; and in response to determining that the current time of day is within the predetermined short cycle time period, controlling execution of at least one subsequent cleaning cycle using the short cycle cleaning process parameters.

The method may further include determining a number of cleaning cycles executed using the short cleaning process parameters during a predetermined period of time; comparing the determined number of cleaning cycles to a predetermined short cycle threshold; and in response to the determined number of cleaning cycles being less than the predetermined short cycle threshold, controlling execution of at least one subsequent cleaning cycle using the default cycle cleaning process parameters.

In another example, the disclosure is directed to a method comprising storing default cleaning cycle parameters and short cleaning cycle parameters, wherein the short cleaning cycle parameters include a total cycle duration that is relatively less than a total cycle duration of the default cleaning cycle; controlling execution by a cleaning machine of at least one cleaning cycle using the default cleaning cycle parameters; determining a time duration between a plurality of consecutive cleaning cycles executed using the default cleaning cycle parameters; determining whether the time durations between at least a predetermined number of the consecutive cleaning cycles satisfied a short cycle threshold; and in response to determining that the time durations between at least the predetermined number of sequential cleaning cycles satisfied the short cycle threshold, controlling execution by the cleaning machine of at least one subsequent cleaning cycle using the short cycle cleaning process parameters.

In another example, the disclosure is directed to an automated cleaning machine comprising at least one processor; at least one storage device that stores default cleaning cycle parameters and short cleaning cycle parameters, wherein the short cleaning cycle parameters include a total cycle duration that is relatively less than a total cycle duration of the default cleaning cycle; the at least one storage device further comprising instructions executable by the at least one processor to: control execution by a cleaning machine of cleaning cycles using the default cleaning cycle parameters; determine a time duration between consecutive cleaning cycles executed using the default cleaning cycle parameters; determine whether time durations between at least a predetermined number of the consecutive cleaning cycles satisfies a short cycle threshold; and in response to determining that the time durations between at least the predetermined number of sequential cleaning cycles satisfied the short cycle threshold, control execution by the cleaning machine of at least one subsequent cleaning cycle using the short cycle cleaning process parameters.

The details of one or more examples are set forth in the accompanying drawings and the description below. Other features will be apparent from the description and drawings, and from the claims.

BRIEF DESCRIPTION OF DRAWINGS

FIG. 9 is a table showing example data regarding cleaning cycle duration and number of HUEs (Heat Unit Equivalents) accumulated under various designed experimental conditions.

DETAILED DESCRIPTION

In general, the disclosure is directed to systems and/or methods of automated cleaning machine processing using including one or more "short" cleaning cycles having shortened cycle times. For example, the systems and/or methods in accordance with the present disclosure may include automated cleaning machines including one or more short cleaning cycles that effectively clean and sanitize items to be cleaned in a shortened time period. The short cycle times may be combined with other short cycle parameters to ensure items are cleaned and sanitized in a shortened time period as compared to default or normal machine cycle settings. Such default settings are often designed to minimize energy and/or cleaning product usage, and thus to clean and sanitize articles while minimizing energy and product related costs. However, these default settings can lead to longer cleaning cycle times as they specify lower temperatures and smaller amounts of cleaning product in order to minimize energy and product usage. Under such default conditions, longer cycle durations are needed to adequately clean and/or sanitize the articles being cleaned. However, these long cycle times are a disadvantage during high volume periods at a restaurant or other food preparation or service establishment. The short cycles of the present disclosure may be used to increase throughput of an automated cleaning machine while ensuring a satisfactory cleaning and/or sanitizing result. The short cycles may thus be especially useful during busy, high volume periods at restaurant or other food preparation or service location.

The short cycle operation in accordance with the present disclosure may be implemented as a cleaning machine cycle setting manually accessible through the user interface of a controller on an automated ware wash machine. The short cycle operation may also be implemented automatically by a cleaning machine controller during predefined periods of the day or when a predetermined threshold number of cleaning cycles per unit time has been reached. When the cleaning machine is experiencing high throughput, one or more short cleaning cycles may be manually selected or automatically initiated to shorten the duration of each individual cleaning cycle and adjust other cleaning cycle parameters to ensure that adequate cleaning and sanitization of the wares exposed to the short cleaning cycle are achieved. The cleaning cycle parameters that may be adjusted for the short cleaning cycles may include wash temperature, rinse temperature, detergent concentration, detergent type, etc. The automated cleaning machine may further include one or more short cycle mode(s) during which short cleaning cycle parameters are used and one or more default cycle mode(s) during which default cleaning cycle parameters are used.

Figure 1:
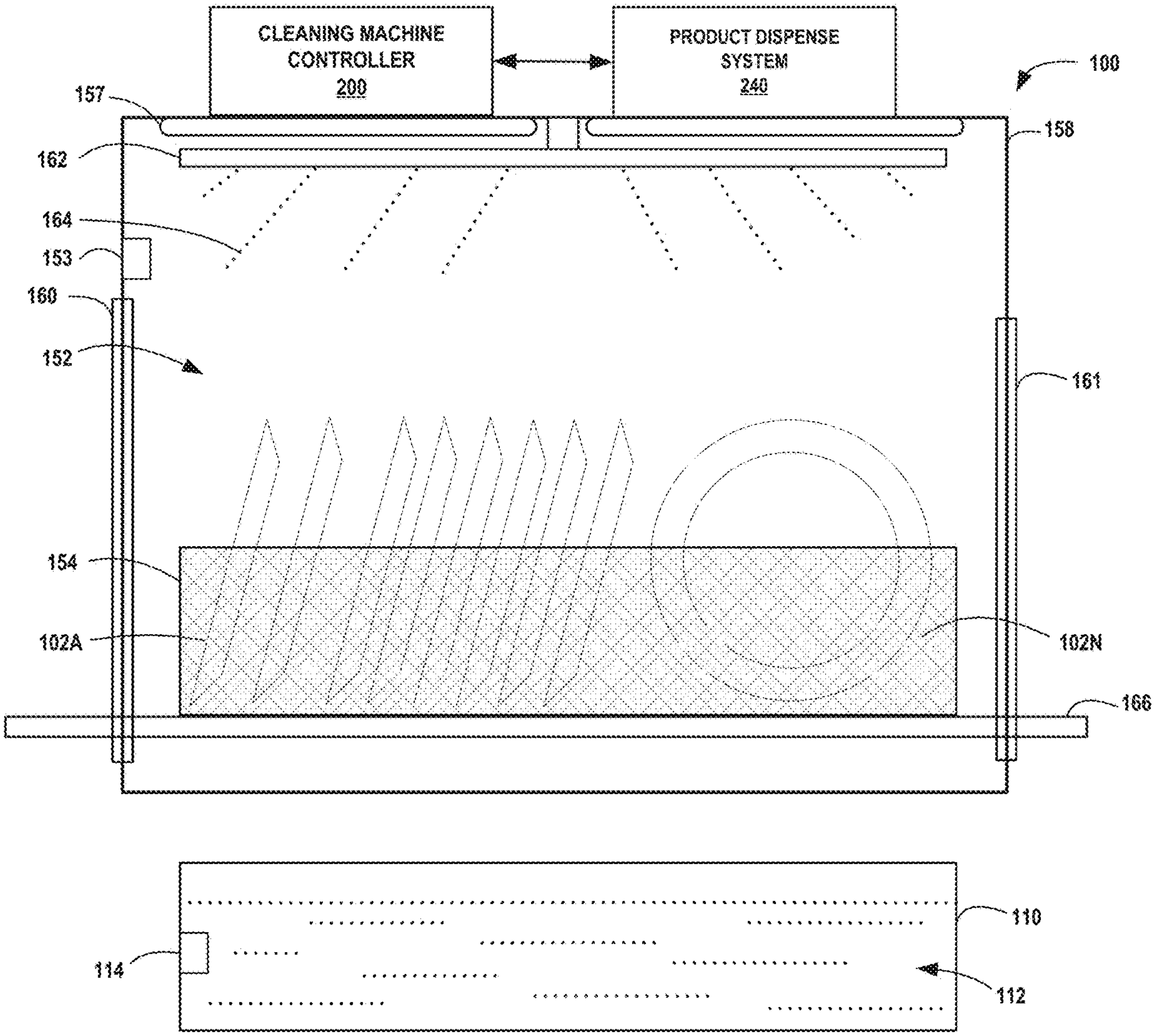
FIG. 1 shows an example automated cleaning machine including one or more short cleaning cycle(s) in accordance with the present disclosure.

FIG. 1 shows an example automated cleaning machine 100 in which short cleaning cycles may be used to clean and/or sanitize articles 102A-102N inside a wash chamber 152 of cleaning machine 100 in accordance with the present disclosure. In this example, cleaning machine 100 is a ware wash or dishmachine for cleaning and/or sanitizing eating and/or food preparation articles 102A-102N. In this example, articles 102A-102N are plates. It shall be understood, however, that articles 102A-102N may also include other eating or food preparation articles such as bowls, coffee cups, glassware, silverware, cooking utensils, pots and pans, etc. It shall further be understood that cleaning machine 100 may include any other type of cleaning machine such as clothes or textile washing machines, medical instrument re-processors, automated washer disinfectors, autoclaves, sterilizers, or any other type of cleaning machine, and that the disclosure is not limited with respect to the type of cleaning machine or to the types of articles to be cleaned.

Cleaning machine 100 includes an enclosure 158 defining one or more wash chamber(s) 152 and having one or more door(s) 160, 161 that permit entry and/or exit into wash chamber 152. One or more removable rack(s) 154 are sized to fit inside wash chamber 152. Each rack 154 may be configured to receive articles to be cleaned directly thereon, or they may be configured to receive one or more trays or holders into which articles to be cleaned are held during the cleaning process. The racks 154 may be general or special-purpose racks, and may be configured to hold large and/or small items, food processing/preparation equipment such as pots, pans, cooking utensils, etc., and/or glassware, dishes and other eating utensils, etc. In a hospital or healthcare application, the racks may be configured to hold instrument trays, hardgoods, medical devices, tubing, masks, basins, bowls, bed pans, or other medical items. It shall be understood that the configuration of racks 154, and the description of the items that may be placed on or in racks 154, as shown and described with respect to FIG. 1 and throughout this specification, are for example purposes only, and that the disclosure is not limited in this respect.

A typical cleaning machine such as cleaning machine 100 operates by spraying one or more cleaning solution(s) 164 (a mixture of water and one or more chemical cleaning products) into wash chamber 152 and thus onto the articles to be cleaned. The cleaning solution(s) are pumped to one or more spray arms 162, which spray the cleaning solution(s) 164 into wash chamber 152 at appropriate times. Cleaning machine 100 is provided with a source of fresh water and, depending upon the application, may also include one or more sumps, such as sump 110, to hold used wash and/or rinse solution 112 to be reused in the next cleaning cycle. Cleaning machine 100 may also include or be provided with a chemical product dispenser 240 that automatically dispenses the appropriate chemical product(s) at the appropriate time(s) during the cleaning process, mixes them with the diluent, and distributes the resulting cleaning solution(s) to the cleaning machine 100 to be dispensed into the wash chamber 152. Depending upon the machine, the articles to be cleaned, the amount of soil on the articles to be cleaned, and other factors, one or more wash phases may be interspersed with one or more rinse phases and/or sanitization phases to form one complete cleaning process of cleaning machine 100.

Automated cleaning machine 100 further includes a cleaning machine controller 200. Controller 200 includes one or more processor(s) that monitor and control various parameters of the cleaning machine 100 such as wash and rinse phase time(s) and duration(s), cleaning solution concentrations, timing dispensation of one or more chemical products, amounts of chemical products to be dispensed, wash and/or rinse phase water temperature(s), timing for application of water and chemical products into the wash chamber, etc. Controller 200 may communicate with a product dispense system 240 in order to monitor and/or control the timing and/or amounts of cleaning products dispensed into cleaning machine 100.

In some examples, cleaning machine controller 200 and/or product dispense system 240 may be configured to communicate with one or more remote computing devices or cloud-based server computing systems. Cleaning machine controller 200 and/or product dispense system 240 may also be configured to communicate, either directly or remotely, with one or more user computing devices, such as tablet computers, mobile computing devices, smart phones, laptop computers.

As shown in FIG. 1, one or more articles to be cleaned, such as plates 102A-102N, may be placed on rack 154 and moved into the wash chamber 152 at the start of a cleaning process. Rack 154 may be moved on a conveyor 166 or other supporting structure. Cleaning machine controller 200 may include one more short cleaning cycles that may be manually or automatically initiated during periods when higher machine throughput is desired. The throughput may be measured in terms of the number of machine cleaning cycles completed per unit time. With the short cleaning cycles of the present disclosure, higher throughput in terms of the number of completed cleaning cycles per unit time may be achieved while ensuring that the articles subjected to the short cleaning cycles are adequately cleaned and sanitized in the shortened time period.

The cleaning machine controller 200 may be programed to automatically initiate short cleaning cycles at one or more defined time periods. For example, the cleaning machine controller 200 may be programmed to automatically run short cleaning cycles during one or more pre-defined high volume periods, such as those time periods associated with breakfast, lunch, and/or dinner, or other expected high volume period. The pre-defined high-volume periods may be customizable to suit the needs of the particular location.

In addition, the short cleaning cycles and the associated cleaning cycle parameters, including the wash and rinse phase durations, the types and amounts of cleaning products dispensed, the wash and rinse water temperatures, etc., may also be customized based on the article type being cleaned for each individual rack. The cleaning process parameters may be directed to the type(s) of soils typically encountered when cleaning each article type. For example, pots and pans may be soiled with large amounts of baked or cooked on starch, sugar, protein, and fatty soils. In contrast, drinking glasses or cups are not typically heavily soiled but have hard to remove soils like lipstick, coffee, and tea stains. In some examples, system controller 200 may control one or more wash parameters of the short cleaning cycle based on the article type to effectively clean and sanitize the wares.

In some examples, the cleaning machine 100 may include one or more sensors that provide additional information about the parameters of the cleaning cycle. For example, cleaning machine 100 may include one or more temperature sensor(s) 153 that measure a temperature inside of the wash chamber 152. In the example of FIG. 1, temperature sensor 153 is positioned on a sidewall inside the wash chamber 152 of cleaning machine 100. The cleaning machine 100 may further include a sump temperature sensor 114 that measures a temperature of solution 112 in sump 110. For example, the sump water temperature may be measured at the start of a cleaning cycle, and at the end of the same cleaning cycle to determine a difference in the sump water temperature that occurred during the cleaning cycle. As another example, the sump water temperature may be measured or sampled continuously throughout the cleaning cycle, at periodic intervals, or at predetermined times during the cleaning cycle. The sump water temperature data may be analyzed to identify a rate of change of the sump water temperature (e.g., the slope or the derivative of the temperature vs. time curve at any given point) at any point(s) in time during the cleaning cycle. The system may analyze the difference in the sump water temperature from one point in time to another point in time, and/or the rate of change in sump water temperature at any given point(s) in time, either alone or in conjunction with other data pertaining to the cleaning cycle, to determine and/or adjust the cleaning cycle parameters to adequately clean and/or sanitize the wares exposed to the associated cleaning cycle of cleaning machine 100. The machine may automatically adjust the current cleaning cycle parameters or may implement the changes in one or more subsequent cycles.

The controller 200 may also analyze an accumulated heat energy (determined based on one or more measured temperatures during the cleaning cycle and one or more the cycle time(s) or durations) for the cleaning cycle and compare to a sanitization threshold to determine whether the accumulated heat energy was sufficient to achieve adequate sanitization of the wares during the cleaning cycle. If the accumulated heat energy does not satisfy the sanitization threshold, controller 200 may extend the wash and/or rinse phases or add additional wash and/or rinse phases to achieve a heat energy level that satisfies the sanitization threshold. Alternatively, the extended wash and/or rinse phases or additional wash and/or rinse phases may be implemented in the next cleaning cycle.

In this way, the techniques of the present disclosure may achieve a satisfactory cleaning and/or sanitizing result using cleaning cycles of overall shorter duration as compared to default or typical cleaning cycles that are optimized in terms of energy and/or product usage. Such default cleaning cycles sacrifice overall cleaning cycle time (that is, they may require longer cleaning cycle durations) in order to reduce energy (e.g., by washing and/or rinsing at lower temperatures) and/or cleaning product costs (e.g., by using less product), and thus to reduce overall cost per cycle as a whole. The short cycle techniques of the present disclosure may thus result in shorter cleaning cycle times and higher throughput (as measured, e.g., as an increased number of executed cleaning cycles per unit time), while ensuring that the articles exposed to the short cleaning cycle are adequately cleaned and sanitized. The short cycle techniques of the present disclosure may further result in reduced labor costs and increased efficiency due to the reduced amount of time required to complete each individual cleaning cycle and increased number of cycles per unit time that may be completed.

In some examples, the cleaning machine controller 200, or a remote computing system (see, e.g., FIG. 2) may generate one or more reports or notifications regarding the short cleaning cycle(s). For example, controller 200 may generate, based on the cleaning machine data generated during the short cleaning cycle, a notification for display, such as display on a user computing device, that includes cleaning cycle parameters associated with the short cleaning cycle, data monitored during the short cleaning cycle or data generated based on analysis of the data monitored before, during, or after the short cleaning cycle, and/or any information associated with the short cleaning cycle(s) run by one or more cleaning machines. The displayed data may further include one or more graphs or charts of the data monitored or generated with respect to the short cleaning cycle(s).

Figure 2:
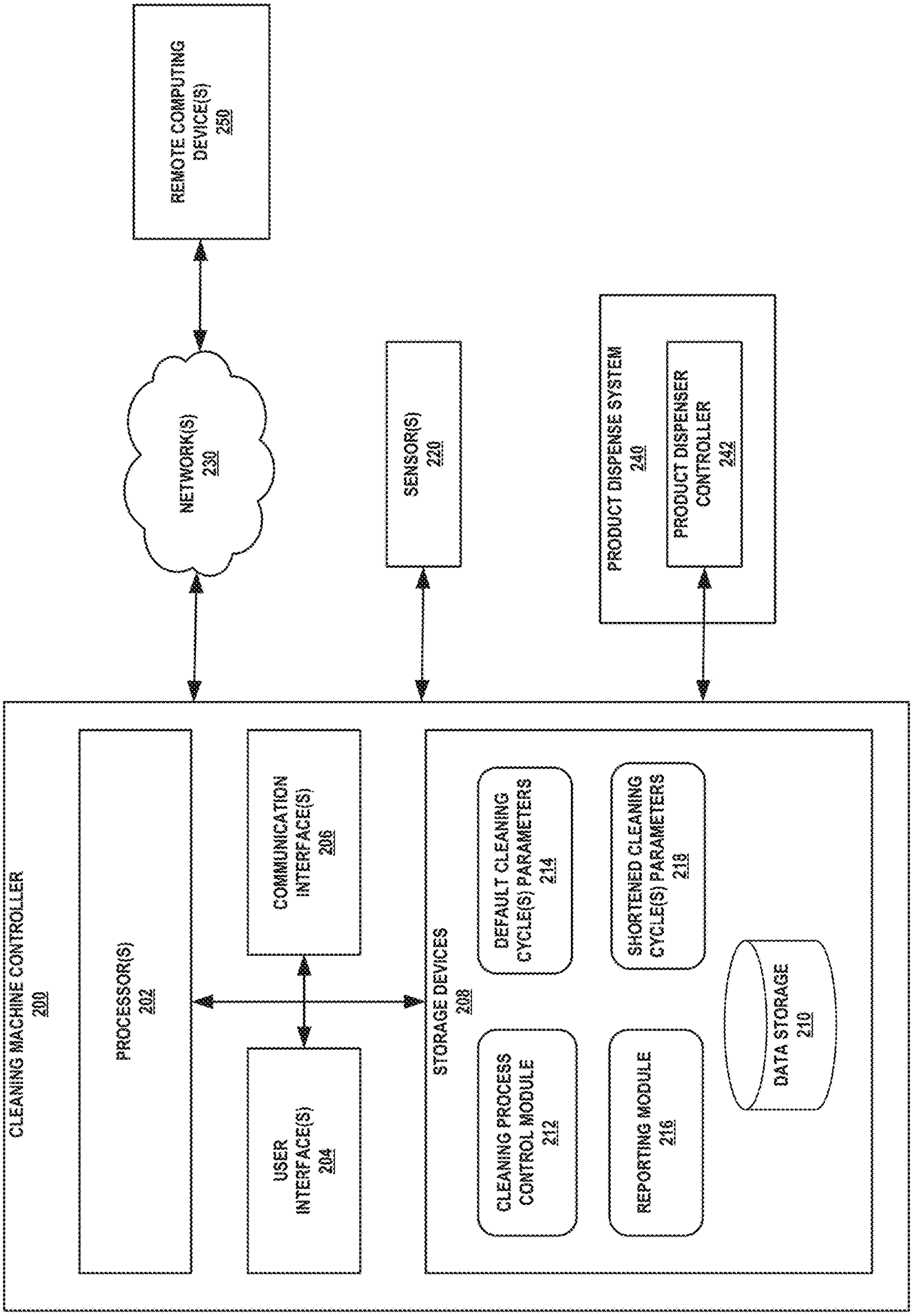
FIG. 2 is a block diagram of an example system that monitors and/or controls operation of an automated cleaning machine including one or more short cleaning cycle(s) in accordance with the present disclosure.

FIG. 2 is a block diagram showing an example cleaning machine controller 200 that controls one or more short cleaning cycles in a cleaning machine in accordance with the present disclosure. Cleaning machine controller 200 is a computing device that includes one or more processors 202, one or more user interface components 204, one or more communication components 206, and one or more data storage components 208. User interface components 204 may include one or more of audio interface(s), visual interface(s), and touch-based interface components, including a touch-sensitive screen, display, speakers, buttons, keypad, stylus, mouse, or other mechanism that allows a person to interact with a computing device. Communication components 206 allow controller 200 to communicate with other electronic devices, such as a product dispenser controller 242 and/or other remote or local computing devices 250. The communication may be accomplished through wired and/or wireless communications, as indicated generally by network(s) 230.

Controller 200 includes one or more storage device(s) 208 that include a cleaning process control module 212, default cleaning cycle parameters 214, short cleaning cycle parameters 218, an analysis/reporting module 216 and data storage 210. Modules 212 and 216 may perform operations described using software, hardware, firmware, or a mixture of hardware, software, and firmware residing in and/or executing at controller 200. Controller 200 may execute modules 212 and 216 with one or more processors 202. Controller 200 may execute modules 212 and 216 as a virtual machine executing on underlying hardware. Modules 212 and 216 may execute as a service or component of an operating system or computing platform, such as by one or more remote computing devices 250. Modules 212 and 216 may execute as one or more executable programs at an application layer of a computing platform. User interface 204 and modules 212 and 216 may be otherwise arranged remotely to and remotely accessible to controller 200, for instance, as one or more network services operating in a network cloud-based computing system provided by one or more of remote computing devices 250.

Default cleaning cycle parameters 214 includes cleaning cycle parameters for one or more default cleaning cycles that are optimized in terms of energy savings, cleaning product savings, or both. Such default cycles typically sacrifice overall cycle duration (that is, the total time required to complete a cleaning cycle tends to be longer) in order to reduce energy consumption, water usage, and/or cleaning product(s) usage. The total duration of the default cleaning cycle tends to be longer so that lower temperature wash or rinse water and smaller amounts of cleaning product may be used. For example, default cleaning cycles in a typical commercial door type dish machine may include a total default cycle duration of between 60 and 360 seconds. As another example, default cleaning cycles in a typical commercial conveyor-type dish machine may include a total default cycle rate of between 3-6 racks per minute.

Short cleaning cycle parameters 218 includes cleaning cycle parameters for one or more short cleaning machine cycles with the goals of reducing cycle duration while providing effective cleaning and sanitizing performance. Such short cycles may use a relatively higher temperature wash and/or rinse water, relatively shorter wash and/or rinse phases, increased amount of product usage, or changes in other cleaning cycle parameters in order to achieve meaningfully short cleaning cycle durations while providing effective cleaning and/or sanitization performance. For example, short cleaning cycles in accordance with the present disclosure for a door type dish machine may have total short cleaning cycle durations of between 30 and 45 seconds.

The cleaning cycle parameters for both the default cleaning cycle process parameters 214 and the short cycle cleaning cycle parameters 218 may include, for example, wash and rinse phase timing and sequencing, wash and rinse water temperatures, sump water temperatures, wash and rinse water conductivities, wash phase duration, rinse phase duration, dwell time duration, wash and rinse water pH, detergent concentration, rinse agent concentration, humidity, water hardness, turbidity, rack temperatures, mechanical action within the cleaning machine, and any other cleaning cycle parameter that may influence the efficacy of the cleaning process. The values for the cleaning cycle parameters are determined differently for the short cycle cleaning cycles of the present disclosure as compared to the default cleaning processes. For example, the short cycle cleaning cycle parameters may include one or more of higher wash water temperatures, higher rinse water temperatures, higher sump water temperatures, shorter wash phase durations, shorter rinse phase durations, larger amounts of one or more cleaning products, or other adjusted cleaning cycle parameters as compared to the default cleaning cycle parameters, in order to achieve a short cleaning cycle having a reduced overall cycle duration while providing effective cleaning and sanitizing of the wares subjected to the short cleaning cycle. The cleaning cycle parameters may be different depending upon the type of machine, for example, door type machines and conveyor type machines may have different default and short cleaning cycle parameters.

Cleaning process control module 212 includes instructions that are executable by processor(s) 202 to perform various tasks. For example, cleaning process control module 212 includes instructions that are executable by processor(s) 202 to initiate and/or control one or more short cleaning cycles in a cleaning machine in accordance with the present disclosure. For example, cleaning process control module 212 may receive a command that was manually input by a user into user interface 204 to initiate a short cleaning cycle. Such a command may be manually input by a user during busy times at a location, when higher throughput in terms of cleaning cycles per unit time may be desirable. As another example, cleaning process control module 212 may be programmed to automatically execute short cleaning cycles during certain predefined time periods, such as the time periods associated with breakfast, lunch, dinner, or other busy or high volume periods at a food establishment. As another example, cleaning process control module 212 may be programmed to automatically determine whether a threshold number of cleaning cycles per unit time has been met and may automatically execute one or more short cleaning cycles when the threshold is satisfied. That is, cleaning process control module 212 may be programmed to automatically determine when the food establishment is experiencing a need for increased cleaning machine throughput (such as when the food establishment is experiencing a high volume of customers or otherwise experiencing a high number of wares to be cleaned) based on the number of cleaning cycles per unit time executed by the cleaning machine, and may automatically execute one or more short cleaning cycles when the condition is satisfied.

Cleaning process control module 212 includes instructions that are executable by processor(s) 202 to initiate and/or control one or more short cleaning cycles using the short cleaning cycle parameters 218. Cycle data corresponding to one or more short cleaning cycles executed by the cleaning machine may be stored in data storage 210.

In accordance with the present disclosure, cleaning process control module 212 may further include instructions executable by the processor(s) 202 to determine the heat energy accumulated over the course of a cleaning cycle to determine whether adequate sanitization of articles subjected to the cleaning cycle has been achieved, and to further control one or more cycles of the cleaning cycle based on the result. For example, if the heat energy accumulated during the course of the cleaning cycle is insufficient to achieve adequate sanitization of the articles, cleaning process control module 212 may determine an extended rinse phase duration needed in order to adequately sanitize the article(s) in the cleaning machine. Controller 200 may then control the cleaning machine to automatically execute the extended rinse phase of the determined duration. In this example, the rinse phase duration is extended because the controller 200 determines that application of additional hot rinse water during an extended rinse phase will accomplish the additional heat transfer necessary to satisfy the sanitization threshold. In this way, cleaning process control module 212 may dynamically control the duration of the rinse phase based on a calculated amount of heat energy accumulated over the duration of a cleaning cycle to ensure that an adequate sanitization result is achieved. In other examples, an extended wash phase, an extended rinse phase, or additional wash and/or rinse phase(s) may be added during the next short cleaning cycle rather than dynamically applied during the current short cleaning cycle.

In accordance with the present disclosure, cleaning process control module 212 may further include instructions executable by the processor(s) 202 to analyze sump water temperatures measured at one or more times during the cleaning and to control one or more cleaning cycle parameters based on the sump water temperature to ensure an adequate cleaning and sanitization result. For example, cleaning process control module 212 may analyze sump water temperatures measured at one or more times during the cleaning cycle, and may automatically determine extended wash and/or rinse phase durations based on the sump water temperature to ensure an adequate cleaning and sanitizing result in achieved.

Analysis/reporting module 216 (or any of cleaning process control module 212, or other software or module stored in storage devices 208) may generate one or more notifications or reports for storage or for display on user interface 204 of controller 200, or on any other local or remote computing device 250, regarding the results of one or more cleaning cycles.

As another example, the reports may include data corresponding to one or more specific cleaning cycles, or data concerning cleaning cycles specific to one or more of a location(s), a cleaning machine(s), a date(s)/time(s), an employee, etc. The data may be used to identify trends, areas for improvement, or otherwise assist the organizational person(s) responsible for ensuring the efficacy of cleaning cycles to identify and address problems in the cleaning cycles.

The report(s) may further include information monitored during one or more cleaning cycles, and the data for each cleaning cycle may include information monitored during execution of the cleaning cycle such as the date and time of the cleaning cycle, a unique identification of the cleaning machine, a unique identification of the person running the cleaning cycle, an article type cleaned during the cleaning cycle, a rack volume or types of racks or trays used during the cleaning cycle, wash phase duration, rinse phase duration, dwell duration, wash and rinse water temperatures, sump water temperatures, wash and rinse water conductivities, wash and rinse water pH, detergent concentration, rinse agent concentration, environmental humidity, water hardness, turbidity, rack temperatures, the types and amounts of chemical product dispensed during each cycle of the cleaning cycle, the volume of water dispensed during each cycle of the cleaning cycle, the total number of HUEs accumulated over the course of the cleaning cycle or other information relevant to the cleaning cycle. The report(s) may also include information concerning the location; the business entity/enterprise; corporate clean verification targets and tolerances; cleaning scores by location, region, machine type, date/time, employee, and/or cleaning chemical types; energy costs; chemical product costs; and/or any other cleaning cycle data collected or generated by the system or requested by a user.

Figure 3A:
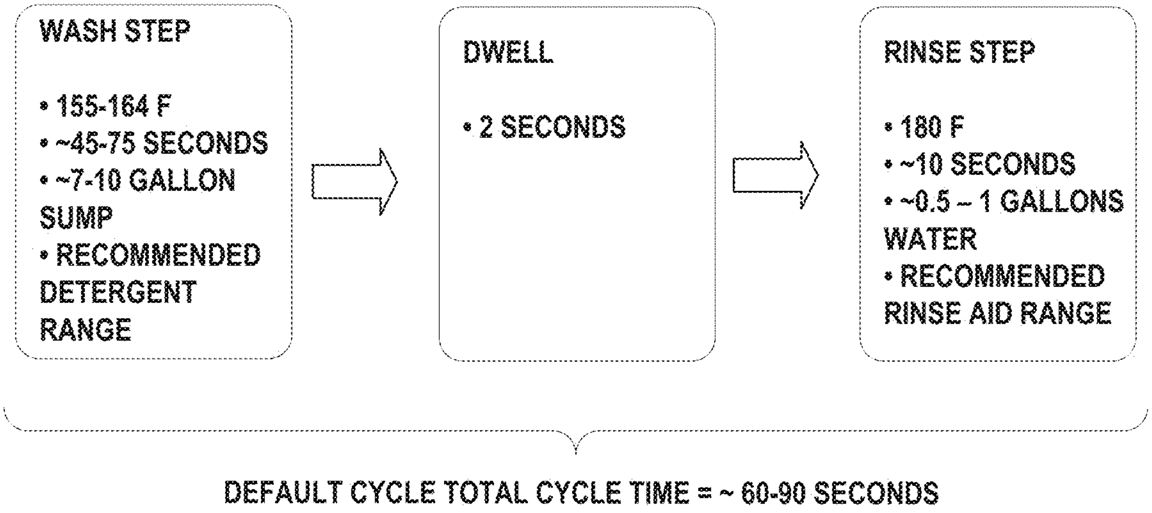
FIG. 3A is a diagram illustrating cycle times for an example default cleaning cycle.
Figure 3B:
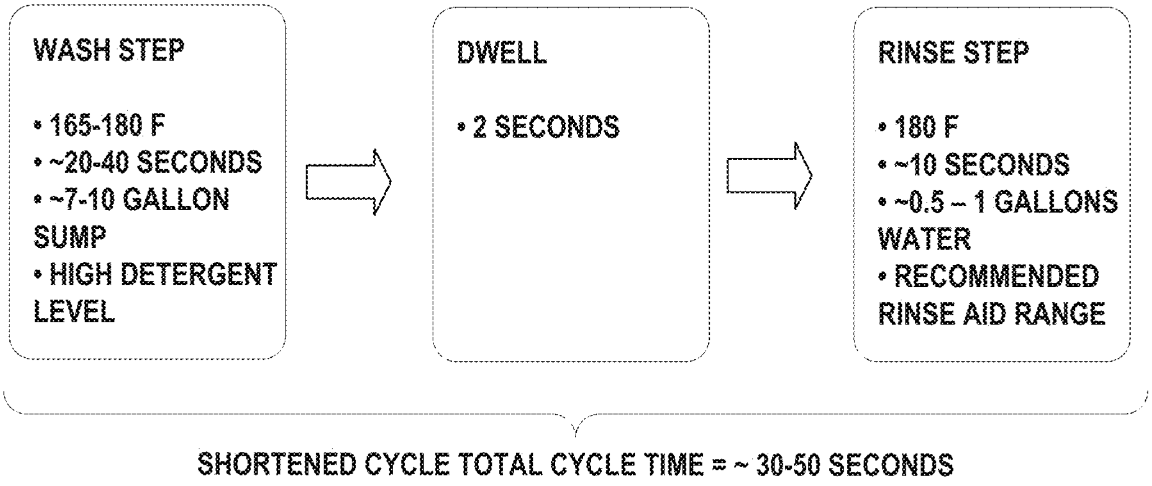
FIG. 3B is a diagram illustrating cycle times for an example short cleaning cycle in accordance with the present disclosure.

FIG. 3A is a graphic showing the individual cycle components for a default cleaning cycle having a total cycle duration of between 60 and 90 seconds. FIG. 3B is a graphic showing the individual cycle components for a short cleaning cycle having a total cycle duration of between 30 and 50 seconds. As seen in FIG. 3A, the wash phase of the default cleaning cycle includes a wash water temperature (sump temperature) of between 155-164 degrees Fahrenheit, a duration of between 45-75 seconds, a total sump volume between 7 and 10 gallons, and a default detergent concentration. The default detergent range may be specified by the manufacturer or set/adjusted by a service technician during installation of the machine or during a service call. The default detergent range may be defined as, for example, 100% of a recommended detergent range. The dwell time (the time between the wash phase and the rinse phase) is about 2 seconds. The rinse phase of the default cleaning cycle includes a wash water temperature (sump temperature) of 180 degrees Fahrenheit, a duration of about 10 seconds, between 0.5 and 1.0 gallons of rinse water (typically fresh rinse water), and a rinse aid concentration in a default rinse aid range. The total cycle duration of the default cleaning cycle is the sum of the duration of the wash phase, the dwell time, and the duration of the rinse phase, for a total default cycle duration of between 60 and 90 seconds in this example.

As seen in FIG. 3B, the wash phase of the short cleaning cycle includes a wash water temperature (sump temperature) of between about 165-180 degrees Fahrenheit, a duration of between about 25-40 seconds, a total sump volume between 7 and 10 gallons, and a detergent concentration that is relatively higher than the default detergent concentration. The higher detergent range may be, for example, may be anywhere between 5-50% higher than the default detergent range. For example, the higher detergent range may be 105% of the recommended detergent range, 110% of the recommended detergent range, 120% of the recommended detergent range, etc. However, it shall be understood that other percentages greater than the default detergent range could also be used. The dwell time is about 2 seconds. The rinse phase of the short cleaning cycle includes a wash water temperature (sump temperature) of 180 degrees Fahrenheit, a duration of about 10 seconds, between 0.5 and 1.0 gallons of rinse water (typically fresh rinse water), and a rinse aid concentration in the default rinse aid range. The total cycle duration of the short cleaning cycle is the sum of the duration of the wash phase, the dwell time, and the duration of the rinse phase, for a total short cycle duration of between about 30-50 seconds in this example, FIGS. 3A and 3B illustrate that by increasing the wash water (sump) temperature from a range of 155 to 164 degrees Fahrenheit to a range of 165-180 degrees Fahrenheit and/or increasing the detergent concentration from a recommended detergent range to a relatively higher detergent range, that a meaningful difference in the total cycle duration can be achieved when using short cycle parameters as compared to default cycle parameters. It shall be understood that either the wash water temperature may be increased, the detergent concentration may be increased, or both the wash water temperature and the detergent concentration may be increased in order shorten the duration of the cleaning cycle, and that the disclosure is not limited in this respect. It shall also be understood that other cleaning cycle parameters may also be adjusted to shorten the duration of the cleaning cycle, e.g., the rinse water temperature, rinse aid concentration, etc., and that the disclosure is further not limited in this respect.

Figure 4:
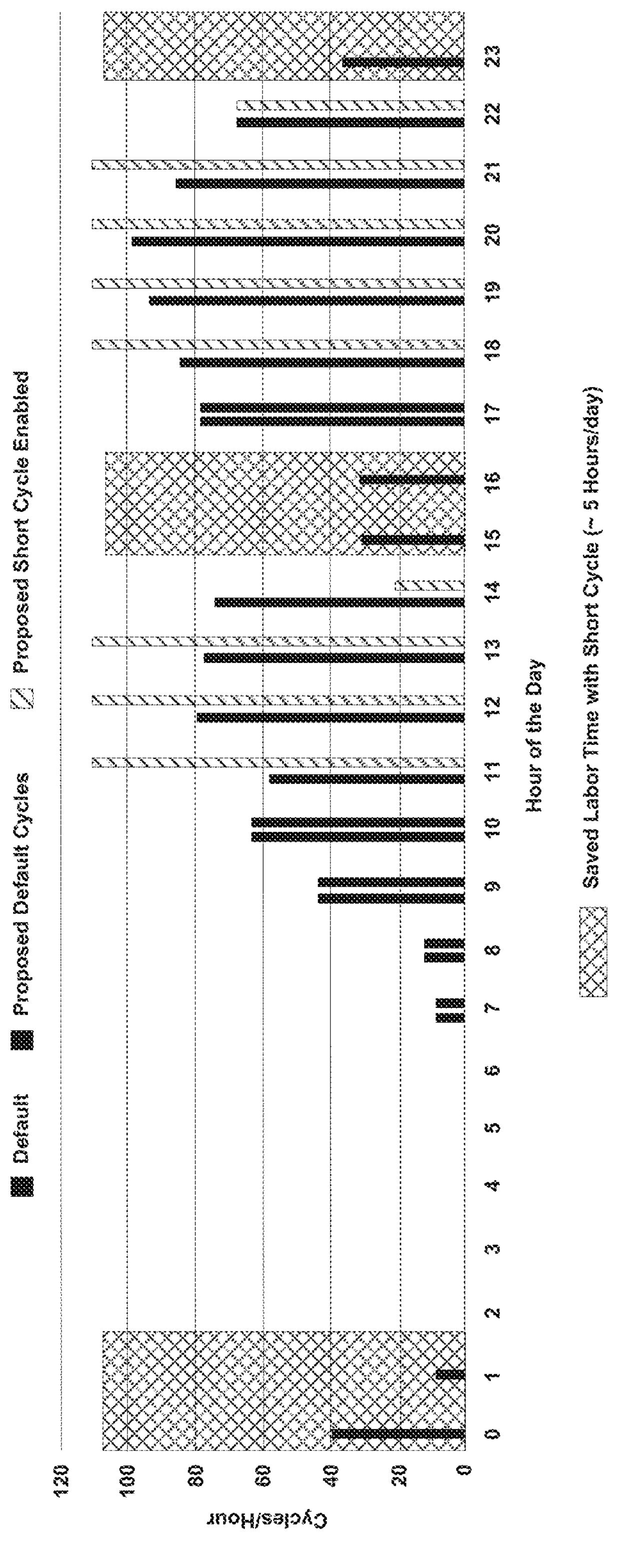
FIG. 4 is a graph illustrating simulated savings per day when using short cleaning cycle(s) at a threshold above 60 cycles per hour.

FIG. 4 is a graph showing a comparison of the number of cleaning cycles run versus hour of the day under two example scenarios: (1) real field data using default machine cycle parameters (black bars), and (2) simulated data that would result if the same number of cycles were run under an example "short cycle enabled" scheme (gray bars and patterned bars). The solid black bars represent example field data for the number of cleaning cycles run per hour in a commercial dish machine using default cleaning cycle parameters over the course of one 24-hour period. The gray bars represent simulated data for cycles run under the default parameters because the short cycle threshold condition has not been met. The patterned bars represent simulated data for short cleaning cycles run when the short cycle threshold condition has been met. The short cycle threshold in this example was taken to be 60 cycles/hour. The number of cycles per hour was increased by 15%. Under these conditions, at cycle rates of fewer than 60 cycles/hour, the number of cycles/hour were simulated using default cleaning cycle parameters (gray bars). At default cycle rates of over 60 cycles/hour, the number of cycles/hour were simulated using short cleaning cycle parameters (15% more cycles/hour). For example, at hours 7, 8, 9 and 10, the number of cycles/hour for the previous hour are below the example short cycle threshold of 60 cycles/hour. The number of cycles/hour during these times thus remained the same as the real field data (gray bars (simulated) and black bars (field data) are the same). At hour 10, the short cycle threshold is exceeded, and remains so through hour 13, and thus the number of cycles per hour for hours 11, 12, 13, and 14 are increased by 15% as indicated by the patterned bars. At hours 15 and 16 of the short cycle simulation, all of the cleaning cycles were previously completed during hours 11, 12, 13, and 14, so no cleaning cycles were run during hours 15 and 16. This is in contrast to the field data default cleaning cycles, where over 30 cleaning cycles were run during each of hours 15 and 16. At hour 17, the short cycle threshold is exceeded, and remains so until hour 22, so that the number of cycles per hour for hours 18, 19, 20, 21, and 22, were increased by 15%. At hour 23, all of the cleaning cycles were previously completed during hours 18, 19, 20, 21, and 22, so no cleaning cycles needed to be run during hour 23 under the short cycle simulation.

By increasing the number of cycles/hour when a predefined short cycle threshold is satisfied, more cycles/hour are executed during those time periods when the short machine cycle parameters are enabled. One ramification of this is that, although the total number of cycles required to clean all of the wares remains the same, that same number of cycles may be completed more quickly. In other words, some of the default cleaning cycles that would have been run later may be effectively time shifted into earlier time periods as short cleaning cycles. As a result, default cleaning cycles that had to be run during certain time periods in the example field data may be eliminated when using short cleaning cycles. And, if all of the wares can be cleaned during those earlier times by enabling short cleaning cycles, there may be time periods of the day when the cleaning machine is idle as compared to when only default machine cycles are used. This further translates to an associated number of hours/day in labor savings, as employees associated with those cleaning cycles are not needed during those time periods. In the FIG. 4, for example, the default cleaning cycles in the example field data that are eliminated by enablement of the short cleaning cycles are indicated by the shaded rectangles. That is, the default cycles run at hours 0, 1, 15, 16, and 23 are not needed when short cycles are enabled, because enablement of the short cleaning cycles at the 60 cycle/hour threshold resulted in those cycles being run more quickly in one or more previous time periods. In this example, the simulation indicates that cleaning machine usage was reduced by approximately 5 hours/day. This reduction in machine usage may further result in approximately 5 hours/day of labor savings. Thus, enabling shortened cleaning cycles may lead not only to an increase in the throughput of a cleaning machine (that is, more cycles may be run per unit time), it may also result in an overall reduction in the amount of time per day the cleaning machine is in use and in an associated amount of labor savings.

Although in the example of FIG. 4 the short cycle threshold is based on a predetermined number of cycles per hour, it shall be understood that a short cycle mode of operation in a cleaning machine may be triggered based on other short cycle thresholds, and that the disclosure is not limited in this respect. For example, the short cycle threshold may be based on time duration(s) between two or more consecutive cleaning cycles. As another example, the short cycle threshold may be based on the time of day.

The cleaning machine data concerning the average number of racks per day vs. time for both default cleaning cycles and short cleaning cycles may yield meaningful information for several different types of food establishments. For example, independent (e.g., stand-alone or non-chain restaurants) food establishments may gain insight into the times of day when execution of short cleaning cycles may be of benefit in terms of the number of cycles executed per time period, in terms of labor savings, or both. As another example, cleaning machine data from multiple locations in a chain-type restaurant may be compared to obtain a high-level view of variations in dishwashing practices across multiple locations within the chain. Based on this analysis, recommendations may be made at a corporate account level in terms of which locations might benefit most from implementing a short cycle algorithm. Several examples of different types of food establishments and the implications of short cycles are described in further detail below.

Figure 5A:
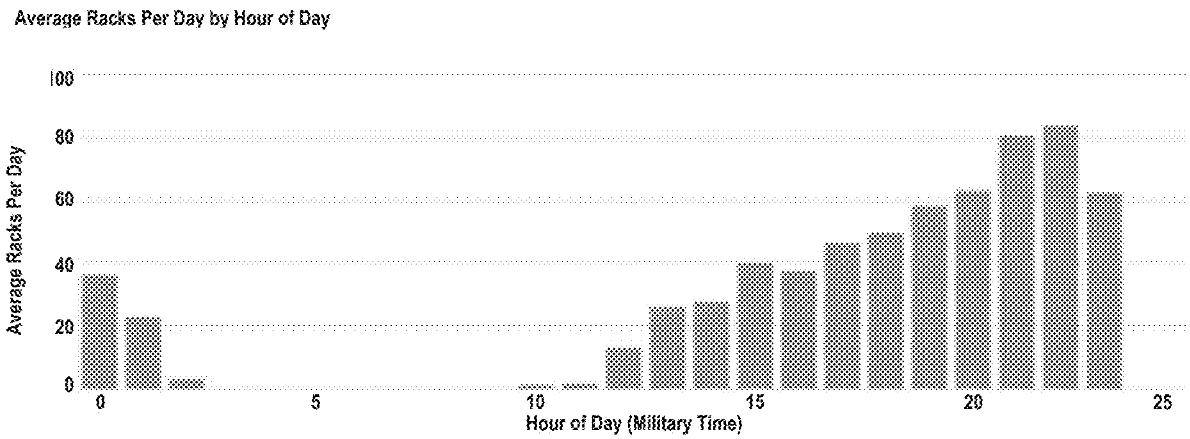
FIGS. 5A and 5B are graphs showing example data regarding average number of cleaning cycles per day by hour of day for two food establishments having different peak wash times throughout the day.
Figure 5B:
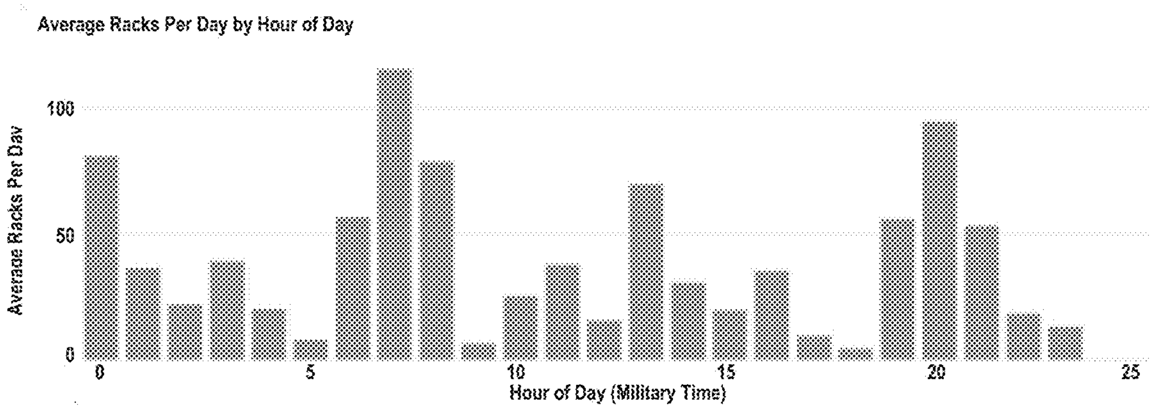

FIGS. 5A and 5B are graphs showing example data regarding average number of cleaning cycles per day by hour of day for two food establishments having different peak wash times throughout the day. FIG. 5A is a graph showing an example average number of cleaning cycles per day vs. time of day for a first type of food establishment. In this example, the food establishment is an independent account that is only open during dinner hours, thus the peak wash times are in the latter parts of the evening (e.g., starting at around 17:00 hours (5 pm)).

An establishment open only during dinner hours such as the example of FIG. 5A may choose to implement short cycle(s) only during the later hours of the evening (such as starting at 5 pm). Implementation of short cycles during peak times would cause the average number of cleaning cycles per hour of day to increase during those peak times, potentially condensing the total time frame in which all cleaning cycles are run. For example, the dish machine may be finished by 10 pm instead of 11 pm.

FIG. 5B is a graph showing an example average number of cleaning cycles per day by hour of day for a second type of food establishment. In this example, the food establishment is an independent account having multiple peak wash times throughout the day (e.g., corresponding to breakfast, lunch, and dinner).

An establishment that is open all day such as the example of FIG. 5B may choose to implement short cycle(s) multiple times throughout the day; for example, short cycles may be enabled during the time periods associated with breakfast (7-8 am hours), lunch (1 pm hours), and dinner (7-9 pm). This would increase the average number of cycles run during these timeframes.

Figure 6A:
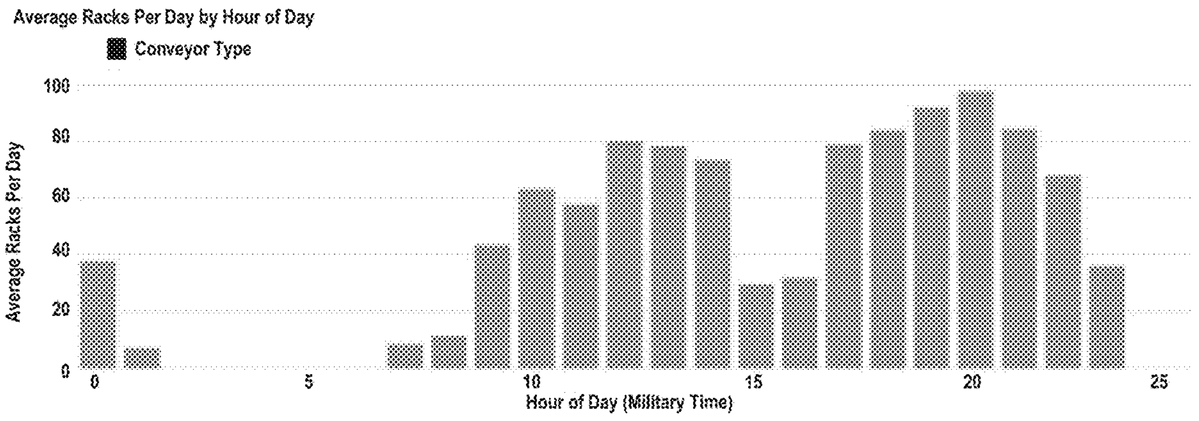
FIGS. 6A and 6B are graphs showing example data regarding the average number of default cleaning cycles per day by hour of day over a 9-month period for two locations of a chain restaurant.
Figure 6B:
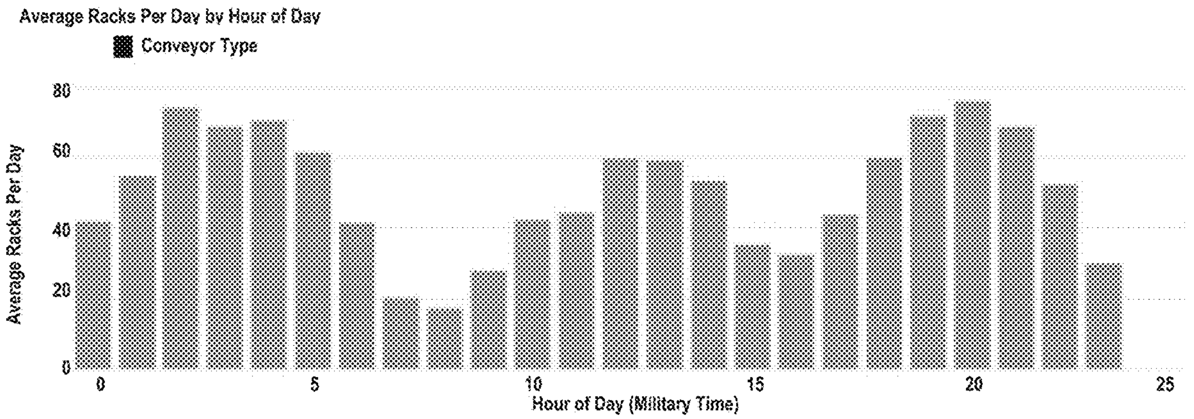

FIGS. 6A and 6B are graphs showing example data regarding the average number of default cleaning cycles per day by hour of day over a 9 month period for two locations of a chain restaurant. FIG. 6A is a graph showing the average number of default cleaning cycles per day by hour of day over a 9 month period for a chain restaurant location running a conveyor machine. Over a 9-month period, this location demonstrated a higher average number of cycles during the 11 am-12 pm hours (lunch) and 5-9 pm hours (dinner) time periods.

FIG. 6B is a graph summarizing 9 months of data showing the average cycles per day by hour of day for another location in the same chain as the example of FIG. 6A, however this location has slightly different peak periods compared to the example of FIG. 6A. The example location of FIG. 6B demonstrates three high volume washing periods: 2-5 am, 12-2 pm, and 6-9 pm.

The cleaning machine data from multiple locations in a chain-type restaurant may be compared to obtain a high-level view of variations in dishwashing practices across multiple locations within the chain. Based on this analysis, recommendations may be made at a corporate account level in terms of which locations might benefit most from implementing a short cycle algorithm. For the locations of FIGS. 6A and 6B, for example, recommendations may be made to implement short cycles only during lunch and dinner times for the location of FIG. 6A, and to implement short cycles during breakfast, lunch and dinner times for the location of FIG. 6B.

Figure 7A:
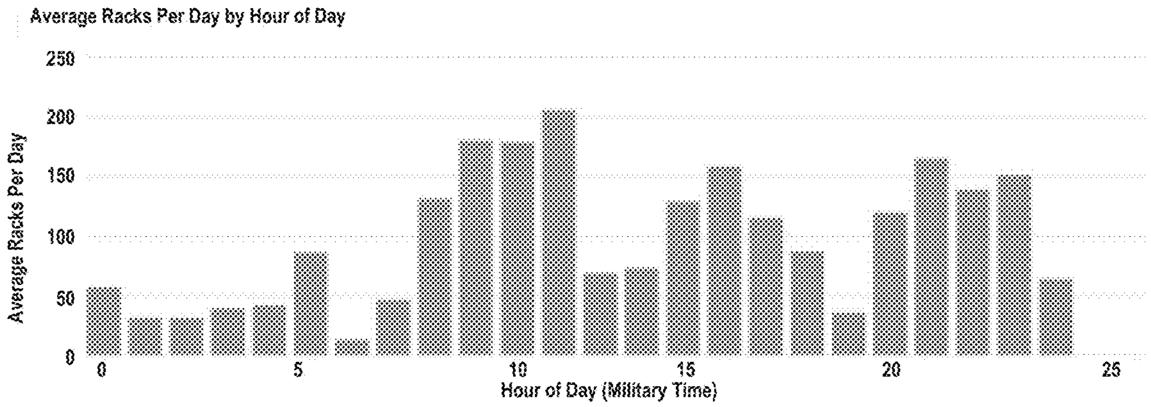
FIGS. 7A and 7B are graphs showing example data regarding average number of default cleaning cycles per day by hour of day as may be experienced by two different types of hotel restaurants.
Figure 7B:
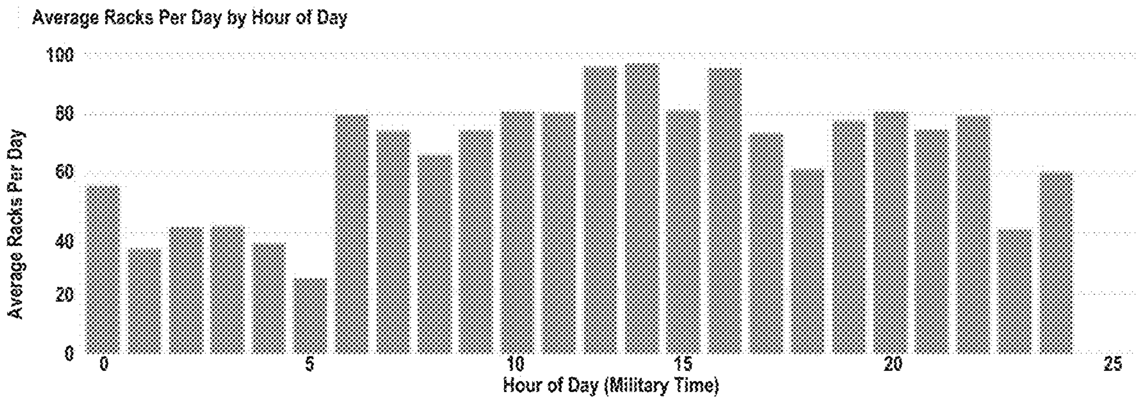

FIGS. 7A and 7B are graphs showing example data regarding average number of default cleaning cycles per day by hour of day as may be experienced by two different types of hotel restaurants. FIG. 7A is a graph showing the average number of default cleaning cycles per day by hour of day as may be experienced by a restaurant within a hotel that serves food and/or room service on and off throughout the day. The pattern shows multiple peak times throughout a day, indicating that the location has low-volume and high-volume times through the day.

FIG. 7B is a graph showing the average number of default cleaning cycles per day by hour of day for a hotel location that runs their dish machine steadily throughout the day, thus indicating they may have a high-volume restaurant(s) that is busy throughout the day and/or room service available throughout the day.

For the example hotel location of FIG. 7B (or any location with a dish machine running steadily throughout the day) may benefit from a human deciding to manually implement short cycles based on factors unique to that location on a day-to-day basis. In other words, when a large event occurs, a user manually inputs a short cycle command into the user interface of the dishmachine (such as by actuating a button, switch or soft key) to change into short-cycle mode. In contrast, for the example hotel location of FIG. 7A (or any location with a dish machine having regular peak times throughout the day) may benefit from a dish machine that automatically switches to short cycle mode at predefined periods of the day, or when a short cycle threshold is met. In other words, the dish machine algorithm may determine whether to implement short cycle mode as opposed to a human user.

In some examples, a combination of automatic and manually enabled short cycles may be appropriate. Thus, the manner in which the short cycles are enabled (manually or automatically) may be customized for each individual machine, for each location (e.g., a location with one or more cleaning machines), or for each customer (e.g., a customer such as a chain having multiple locations with one or more cleaning machines at each location).

Figure 8A:
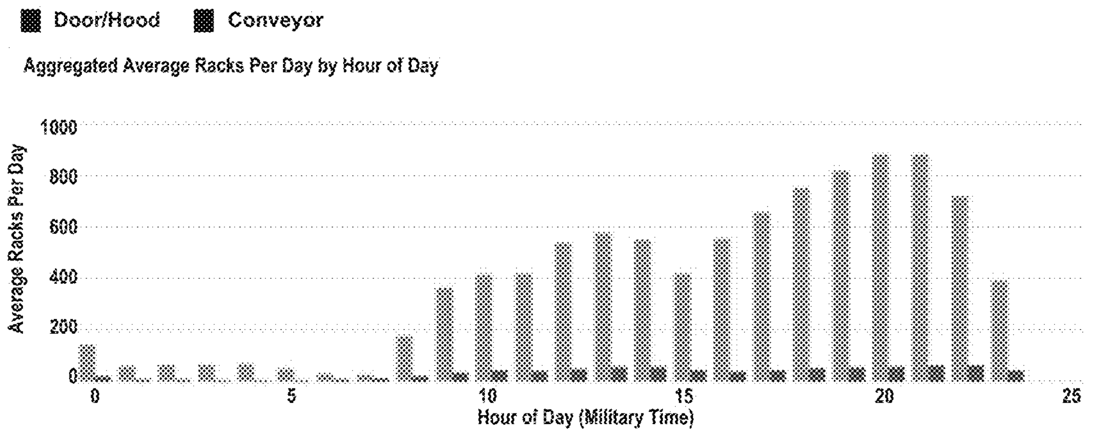
FIG. 8A-8C are graphs showing example data aggregating the number of cleaning cycles per day by hour of day for two different types of dish machines (door type and conveyor type) across multiple locations.
Figure 8B:
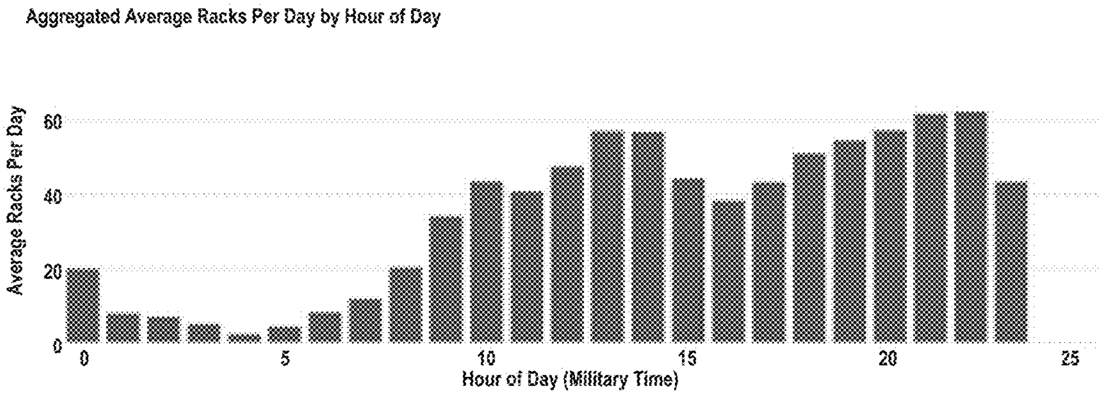
Figure 8C:
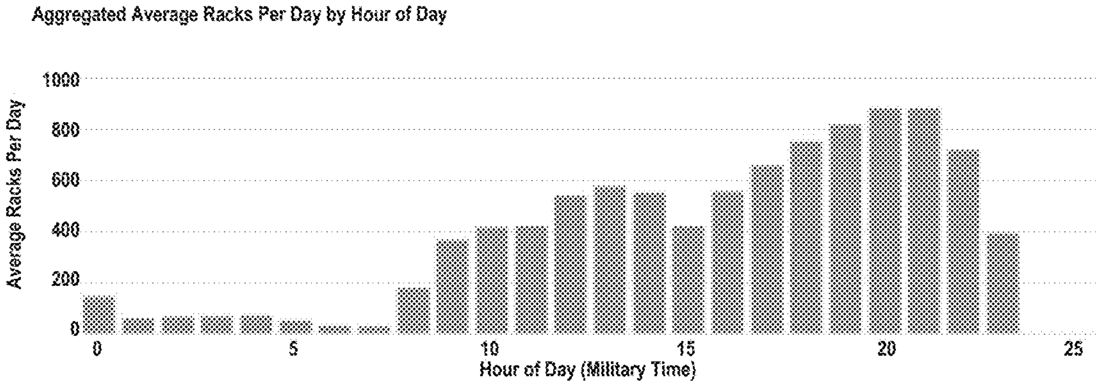

FIG. 8A-8C are graphs showing example data aggregating the average number of cleaning cycles per day by hour of day for two different types of dish machines (door type and conveyor type) across multiple locations. FIG. 8A is a graph showing example data aggregating the average number of racks per day by hour of day for two different types of dish machines (door type and conveyor type) across multiple locations. The data shows that conveyor machines (gray bars) on average run a lot more cleaning cycles than door machines (black bars). However, they do have similar profiles for peak periods, as shown in FIGS. 8B (door machines) and 8C (conveyor machines).

FIG. 8B is a graph showing example data aggregating average racks per day by hour of day across multiple locations using door type cleaning machines. On average the number of cycles run each hour is much lower as compared to conveyor machines (FIG. 8C); however, there are generally two peak dish washing periods per day—after lunch (1-2 pm) and after dinner (8-10 pm hours) in this example.

FIG. 8C is a graph showing example data aggregating average number of racks per day by hour of day across multiple locations using conveyor type cleaning machines. On average the number of cycles run each hour is much higher as compared to door machines (FIG. 8B). However, there are generally two peak dish washing periods per day—after lunch (12-2 pm hours) and after dinner (7-9 pm hours) in this example.

Because conveyor machines have higher throughput per hour than door machines, implementation of short cycles, especially during peak times would be most beneficial for these locations. For example, a 15% faster cycle time would increase the throughput from, for example, approximately 100 cycles/hour to approximately 115 cycles/hour, which is an increase in the number of wares that can be completed in a time period. In addition, the short cleaning cycles would be effectively time-shifted to an earlier time period as compared to the default cleaning cycles (due to more cycles being completed earlier).

FIG. 9 is a table showing cleaning time and number of HUEs (Heat Unit Equivalents) accumulated under various experimental conditions. The rows highlighted in green are the conditions at which a representative food soil was removed from a verification coupon in under 45 seconds. This experimental data shows that at detergent concentrations of at least 80% of the default detergent concentration, the representative food soil was removed in under 45 seconds. At higher detergent concentration and high wash temperature, food soil was consistently removed in under 20 seconds. If the wash temperature was dropped, the cleaning time moved to approximately 35 seconds. These experiments show that food soil may be adequately removed in under 20 seconds at the appropriate operating conditions. In order to meet sanitization requirements for high temperature ware washing operations, NSF standards state that it is necessary to accumulate ≥3600 HUEs over the course of the cycle to achieve heat sanitization. The experimental data of FIG. 9 show that cleaning performance and adequate HUEs for sanitization may be met with a cleaning cycle of less than 45 seconds.

Figure 10:
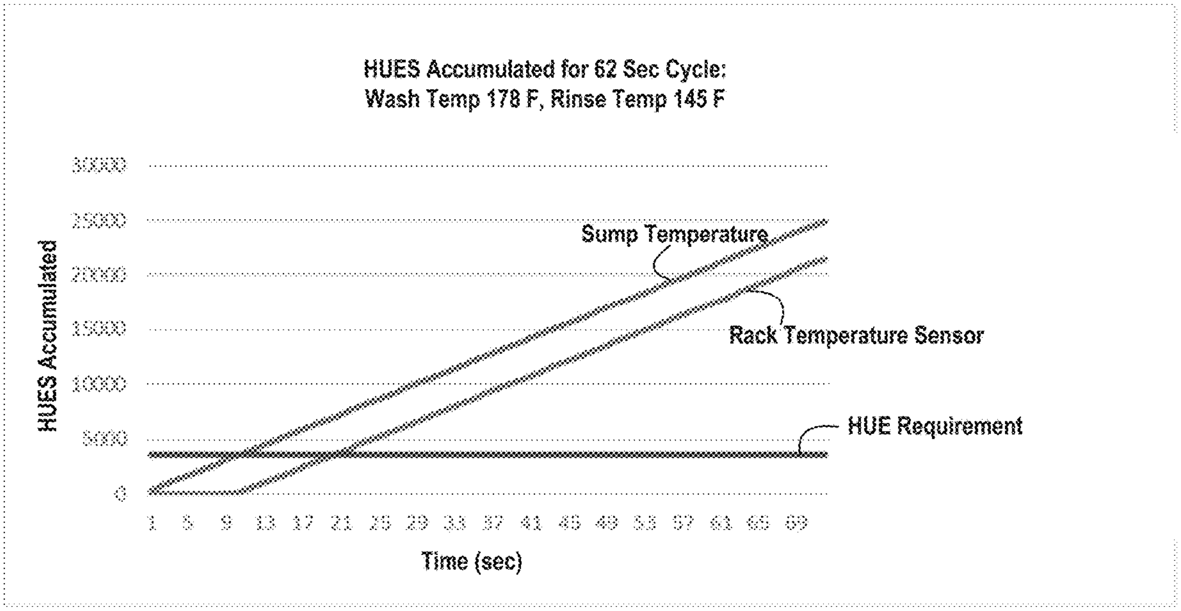
FIG. 10 is a graph showing experimental results of accumulated HUEs over time for a designed experiment in a cleaning machine.

FIG. 10 is a graph showing experimental results of the accumulated HUEs over time for an example 62 second cleaning cycle having a wash temperature of 178° F. and a rinse temperature of 145° F. As can be seen in the graph, the 3600 HUE NSF standard value is achieved after 10 seconds when based on the sump temperature. The experimental data of FIG. 10 shows that adequate HUEs for sanitization maybe reached using short cleaning cycles.

Figure 11:
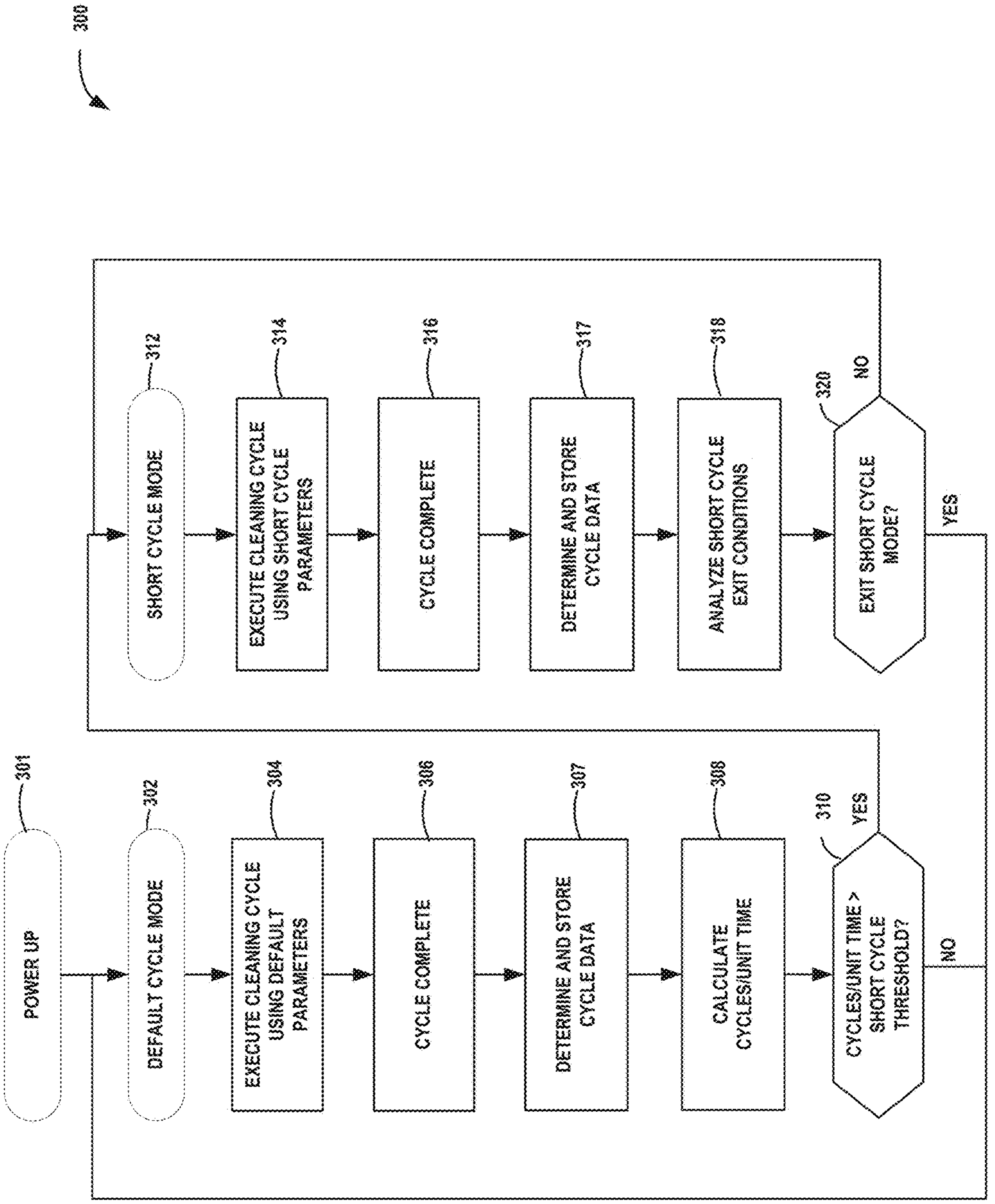
FIG. 11 is a flowchart illustrating an example process (300) by which a computing device controls one or more cleaning cycles in a cleaning machine in either a default cycle mode (302) or a short cycle mode (312) in accordance with the present disclosure. The computing device determines whether the cleaning machine should operate in default cycle mode or short cycle mode based on an analysis of a number of cleaning cycles completed per unit time.

FIG. 11 is a flowchart illustrating an example process (300) by which a computing device controls one or more cleaning cycles in a cleaning machine in either a default cycle mode (302) or a short cycle mode (312) in accordance with the present disclosure. In this example, the computing device determines whether the cleaning machine should operate in default cycle mode or short cycle mode based on an analysis of a number of cleaning cycles completed per unit time. The computing device may include, for example, the example cleaning machine controller 200 of FIG. 2, and the process (300) may be controlled based on execution of instructions stored in cleaning process control module 212 and executed by processor(s) 202.

Upon powering up (301), the computing device of the automated cleaning machine may automatically enter a default cycle mode (302). In default cycle mode, the computing device controls the default cleaning process(es) based on default cleaning cycle parameters. The default cleaning cycle parameters, such as wash phase duration, rinse phase duration, cleaning product concentrations, wash water temperatures, rinse water temperatures, etc., are designed to minimize energy and/or cleaning product usage and thus to minimize energy and product related costs while still achieving adequate cleaning and sanitization of the articles inside the machine. The default cycle parameters may be stored in, for example, storage device(s) 208 as default cleaning cycle parameters 214 as shown in FIG. 2.

In default mode (302), the computing device controls execution of a default cleaning cycle using the default cycle parameters (304). For example, the computing device may send one or more command signal(s) to a cleaning machine (such as cleaning machine 100 as shown in FIG. 1) to execute a cleaning process using the default cycle parameters.

When the default cycle is complete (306), the computing device may determine and store cycle data associated with the default cleaning cycle (307), such as a cycle type (e.g., default), the target default cycle parameters associated with the default cleaning cycle, actual machine parameters measured or sensed during the default cleaning cycle, an updated cycle count, a time and date stamp, a machine id, a cycle id, a location, store, and/or corporate id, and/or any other data associated with the default cleaning cycle. The default cycle data may be stored in, for example, data storage 210 of storage device(s) 208 as shown in FIG. 2.

The default cycle parameters in default mode can lead to longer duration cleaning cycles as they specify lower temperatures and smaller amounts of cleaning product in order to minimize energy and product usage. Under such default conditions, longer cycle durations are needed to adequately clean and/or sanitize the articles being cleaned. However, these long cycle times are a disadvantage during high volume periods at a restaurant or other food preparation or service establishment. Thus, in accordance with the present disclosure, the computing device includes a short cycle mode, during which cleaning cycles of shortened duration (as compared to the default cleaning cycles) are executed by the cleaning machine. The short cycles of the present disclosure may be used to increase throughput of an automated cleaning machine while ensuring a satisfactory cleaning and/or sanitizing result. The short cycles may thus be especially useful during busy, high volume periods at restaurant or other food preparation or service location, or at other times when higher throughput of a cleaning machine is desired.

To that end, in the example process (300) of FIG. 11, the computing device calculates a total number of default cycles completed per unit time (308). For example, the computing device may calculate the number of default cleaning cycles that have occurred during a predefined time period, such as during the immediately preceding 30 minutes, the immediately preceding 60 minutes, or other predefined time period. As another example, the computing device may calculate the number of default cleaning cycles that have occurred since a specified time, such as since the start of the current full hour (e.g., during the current hour of a 24-hour day, where each hour is numbered from 0 to 23, such as shown in FIGS. 4-9).

The computing device compares the number of default cycles per unit time to a predefined short cycle threshold (310). The short cycle threshold is the number of default cycles occurring per unit time after which the cleaning machine will automatically transition from default cycle mode to short cycle mode. If the number of default cycles per unit time does not satisfy the short cycle threshold (310), the computing device remains in the default cycle mode (312), and will control execution of the next cleaning cycle in default cycle mode using the default cycle parameters.

If the number of default cycles per unit time satisfies the short cycle threshold (310), the computing device enters short cycle mode (312). In short cycle mode, the computing device controls one or more short cycle cleaning process(es) based on short cleaning cycle parameters. The short cleaning cycle parameters, such as wash phase duration, rinse phase duration, cleaning product concentrations, wash water temperatures, rinse water temperatures, etc., are designed to minimize total cleaning cycle duration while adjusting (if need be) wash water temperature, rinse water temperature, and/or cleaning product usage to effectively clean and sanitize the articles inside the machine. The short cycle parameters may be stored in, for example, storage device(s) 208 as shortened cleaning cycle parameters 218 as shown in FIG. 2.

In short cycle mode (312), the computing devices controls execution of a shortened cleaning cycle (or simply, "short cycle") using the short cycle parameters (314). For example, the computing device may send one or more command signal(s) to a cleaning machine (such as cleaning machine 100 as shown in FIG. 1) to execute a shortened cleaning process using the short cycle parameters.

When the short cycle is complete (316), the computing device may determine and store short cycle data associated with the short cleaning cycle (317), such as a cycle type (e.g., short), the target short cycle parameters associated with the short cleaning cycle, actual machine parameters measured or sensed during the short cleaning cycle, an updated cycle count, a time and date stamp, a machine id, a cycle id, a location, store, and/or corporate id, and/or any other data associated with the short cleaning cycle. The short cycle data may be stored in, for example, data storage 210 of storage device(s) 208 as shown in FIG. 2.

At some point before execution of the next cleaning cycle, the computing device analyzes one or more short cycle exit conditions (320). That is, the computing device may determine whether one or more conditions are satisfied to determine whether to exit short cycle mode. For example, if the cleaning machine is turned-off, and subsequently powered on, the cleaning machine will startup in default mode (302). As another example, if the computing device receives an indication associated with command that was manually input into the user interface of the cleaning machine to return to default mode, the cleaning machine will exit short cycle mode and return to default mode. As another example, the computing device may determine an idle time by monitoring a length of time since the end of the most recent cleaning cycle. If the cleaning machine has been idle for a predetermined period of time, the computing device may exit short cycle mode and return to default mode. As another example, if the number of cleaning cycles completed per unit time is below a threshold number, the computing device may exit short cycle mode and return to default mode. If the computing device determines that any of the conditions for exiting short cycle mode are satisfied (320), the computing device exits short cycle mode and returns to default mode (302).

An example of process (300) may be further explained by reference to FIG. 4. Assume, for example, that the cleaning machine of FIG. 4 was powered up at hour 7. The machine enters default mode upon startup, as indicated by the gray bar at hour 7. The machine continues in default mode during hours 8, 9, and 10, until at hour 10 the machine determines that the short cycle threshold of 60 cycles/hour has been satisfied. The machine then switches to short cycle mode, and therefore the cleaning cycles in hours 11, 12, 13, and 14 are executed in short cycle mode (patterned bars). After each cleaning cycle in short cycle mode, the machine checks whether any of the short cycle mode exit conditions are satisfied. In the example of FIG. 4, at least one of the short cycle mode exit conditions are met at hour 14, when the number of cycles per hour falls below the short cycle threshold of 60 cycles/hour. (Although the thresholds for entering and exiting short cycle mode are both described as being 60 cycles/hour in this example, it shall be understood that the thresholds for entering and exiting short cycle mode need not be 60 cycles/hour and also that the thresholds need not be the same). The machine then returns to default mode, and thus when the next cycle is run during hour 17, the machine has returned default mode as indicated by the gray bar at hour 17. The number of cycles/hour at hour 17 again satisfies the short cycle threshold, and the machine enters short cycle mode. The cleaning cycles during hours 18, 19, 20, 21, and 22 are thus executed in short cycle mode (patterned bars). At hour 23, there are no cycles run, which is below the short cycle threshold, so the cleaning machine will return to default mode during the subsequent hour 0 (not shown in FIG. 4).

As another example, at hour 15, the cleaning machine may determine that the machine was idle for that hour, and may return to default mode for that reason. In addition, the cleaning machine may receive a manually input command to return to default mode at any time during execution of short cycle mode.

Figure 12:
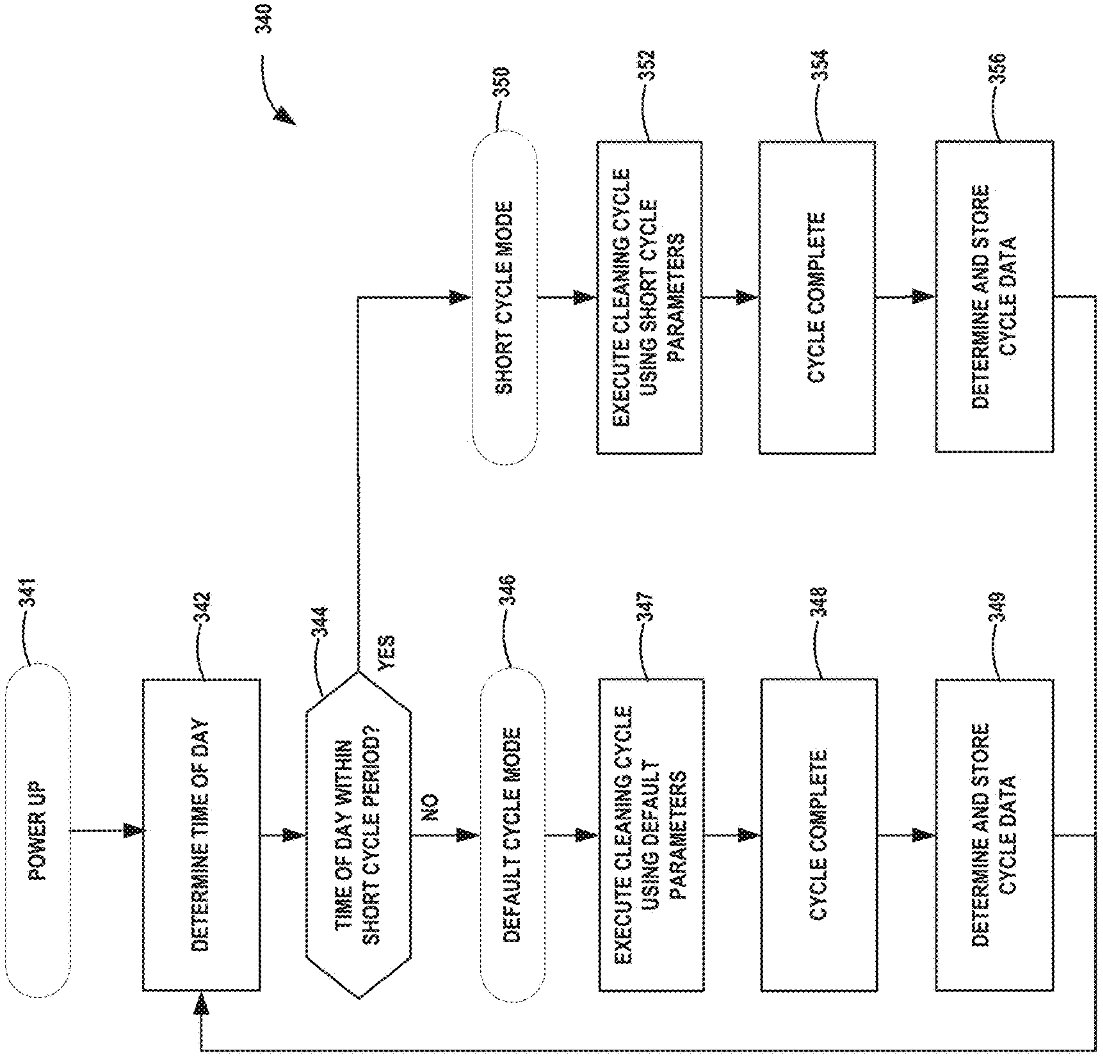
FIG. 12 is a flowchart illustrating another example process (340) by which a computing device controls one or more cleaning cycles in a cleaning machine in either a default cycle mode (346) or a short cycle mode (350) in accordance with the present disclosure. In this example, the computing device determines whether the cleaning machine should operate in default cycle mode or short cycle mode based on the time of day.

FIG. 12 is a flowchart illustrating another example process (340) by which a computing device controls one or more cleaning cycles in a cleaning machine in either a default cycle mode (346) or a short cycle mode (350) in accordance with the present disclosure. In this example, the computing device determines whether the cleaning machine should operate in default cycle mode or short cycle mode based on the time of day. The computing device may include, for example, the example cleaning machine controller 200 of FIG. 2, and the process (340) may be controlled based on execution of instructions stored in cleaning process control module 212 and executed by processor(s) 202.

Upon powering up (341), the computing device determines the time of day (342) and determines whether the time of day is within a predefined short cycle time period (344). For example, the computing device may be programmed to execute short cleaning cycles during time of the day when the cleaning machine is usually busy. In a restaurant, for example, the cleaning machine maybe programmed to execute short cleaning cycles during predefined times associated breakfast, lunch, dinner and/or other busy times for the restaurant, when higher throughput of the cleaning machine (that is, an increased number of cycles/unit time) is desired. If the time of day is not within a predefined short cycle time period (344), the computing device of the automated cleaning machine enters default cycle mode (346). In default cycle mode, the computing device controls the default cleaning process(es) based on default cleaning cycle parameters (348). At the completion of each cycle (or before the beginning of each cycle) (346), the computing device determines the time of day (342) to determine whether to remain in default mode or to switch to short cycle mode (344).

If the time of day is within a predefined short cycle time period (344), the computing device of the automated cleaning machine enters short cycle mode (350). In short cycle mode, the computing device controls the short cycle cleaning process(es) based on short cleaning cycle parameters (352). At the completion of a cycle (354), the computing device determines the time of day (342) and determines whether to remain in default mode or to switch to short cycle mode (344).

Figure 13A:
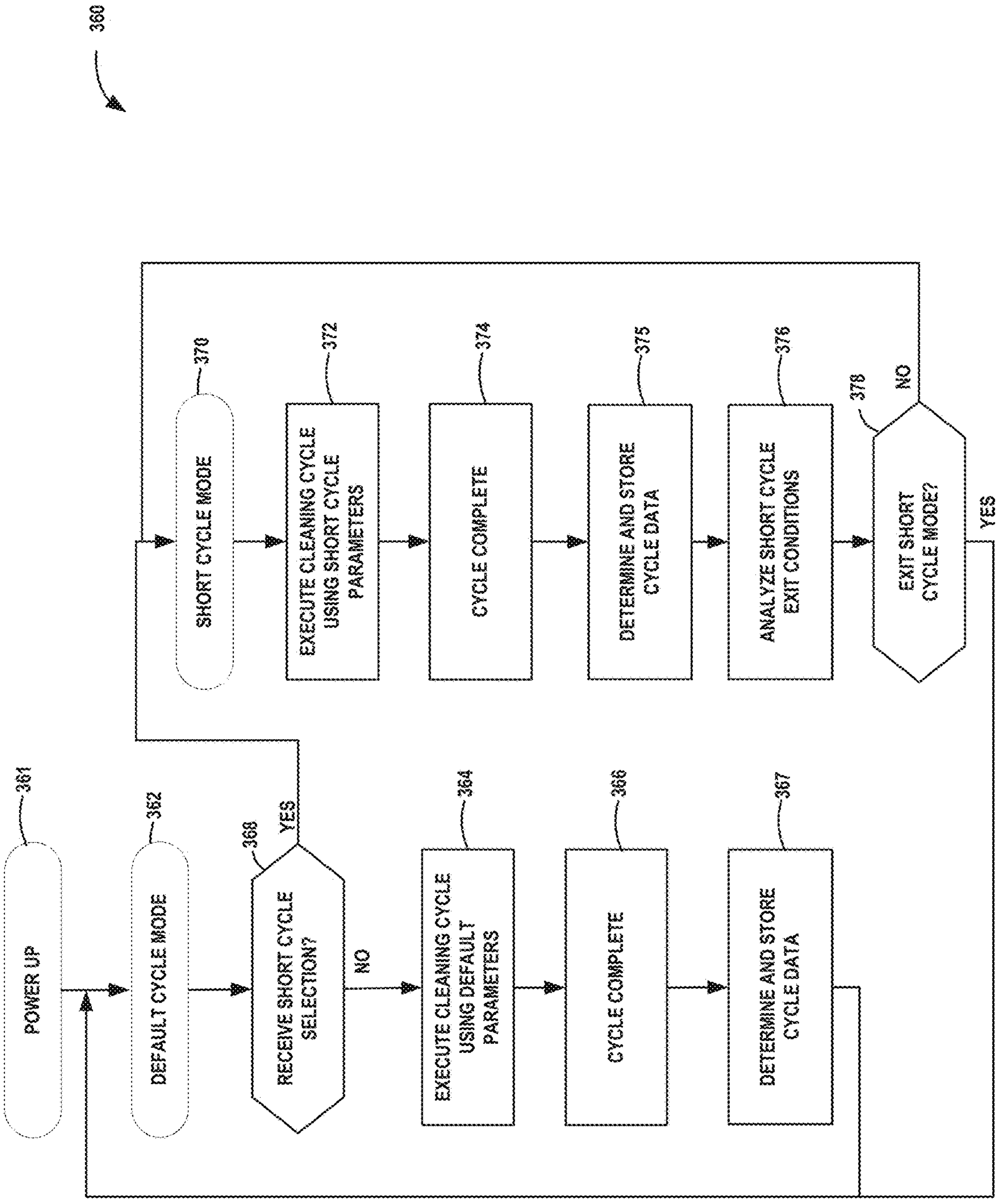
FIG. 13A is a flowchart illustrating an example process by which a computing device controls one or more cleaning cycles in a cleaning machine in either a default cycle mode or a short cycle mode based on manually input selections in accordance with the present disclosure.

FIG. 13A is a flowchart illustrating an example process (360) by which a computing device controls one or more cleaning cycles in a cleaning machine in either a default cycle mode (362) or a short cycle mode (370) based upon a manually input user selection in accordance with the present disclosure. The computing device controls operation of a cleaning machine based on receipt of a selection that is manually entered by a user at a user interface of the cleaning machine. When the cleaning machine is experiencing high throughput, one or more short cleaning cycles may be manually selected to shorten the duration of each individual cleaning cycle and adjust other cleaning cycle parameters to ensure that adequate cleaning and sanitization of the wares exposed to the short cleaning cycle are achieved. The computing device may include, for example, the example cleaning machine controller 200 of FIG. 2, and the process (360) may be controlled based on execution of instructions stored in cleaning process control module 212 and executed by processor(s) 202.

Upon powering up (301), the computing device of the automated cleaning machine may automatically enter a default cycle mode (362). Before execution of a cleaning cycle, the computing device determines whether a short cycle mode has been selected by a user (368). For example, a user may manually select short cleaning cycles when the cleaning machine is experiencing or expecting to experience high demand, so as to shorten the duration of each individual cleaning cycle to achieve higher throughput. If no short cycle command has been received (368), the computing device remains in default cycle mode (362). The short cleaning cycle mode may be manually selected, for example, by a user through a user interface of the dishmachine controller.

In default cycle mode, the computing device controls the default cleaning process(es) based on default cleaning cycle parameters as described herein (364). When each default cycle is complete (366), the computing device may determine and store default cycle data associated with the default cleaning cycle (367), such as a cycle type (e.g., default), the target default cycle parameters associated with the default cleaning cycle, actual machine parameters measured or sensed during the default cleaning cycle, an updated cycle count, a time and date stamp, a machine id, a cycle id, a location, store, and/or corporate id, and/or any other data associated with the default cleaning cycle. The default cycle data may be stored in, for example, data storage 210 of storage device(s) 208 as shown in FIG. 2.

If a short cycle selection has been received, the computing device transitions from default mode to short cycle mode (370). In short cycle mode, the computing device controls the short cycle cleaning process(es) based on short cleaning cycle parameters (372). For example, the computing device automatically adjusts other cleaning cycle parameters (such as temperature and/or detergent concentration) to ensure that adequate cleaning and sanitization of the wares exposed to the short cleaning cycle are achieved. When each short cycle is complete (374), the computing device may determine and store short cycle data associated with the short cleaning cycle (375), such as a cycle type (e.g., short), the target short cycle parameters associated with the short cleaning cycle, actual machine parameters measured or sensed during the short cleaning cycle, an updated cycle count, a time and date stamp, a machine id, a cycle id, a location, store, and/or corporate id, and/or any other data associated with the short cleaning cycle. The short cycle data may be stored in, for example, data storage 210 of storage device(s) 208 as shown in FIG. 2.

At some point before execution of the next cleaning cycle, the computing device analyzes one or more short cycle exit conditions (376). That is, the computing device may determine whether one or more conditions are satisfied to determine whether to exit short cycle mode and transition to default mode. For example, if the cleaning machine is turned-off, and subsequently powered on (361), the cleaning machine will startup in default mode (362). As another example, if the computing device receives an indication associated with command that was manually input into the user interface of the cleaning machine to return to default mode, the cleaning machine will exit short cycle mode and return to default mode. As another example, the computing device may determine an idle time by monitoring a length of time since the end of the most recent cleaning cycle. If the cleaning machine has been idle for a predetermined period of time, the computing device may exit short cycle mode and return to default mode. As another example, if the number of cleaning cycles completed per unit time is below a threshold number, the computing device may exit short cycle mode and return to default mode. If the computing device determines that any of the conditions for exiting short cycle mode are satisfied (375), the computing device exits short cycle mode and returns to default mode (362).

Figure 13B:
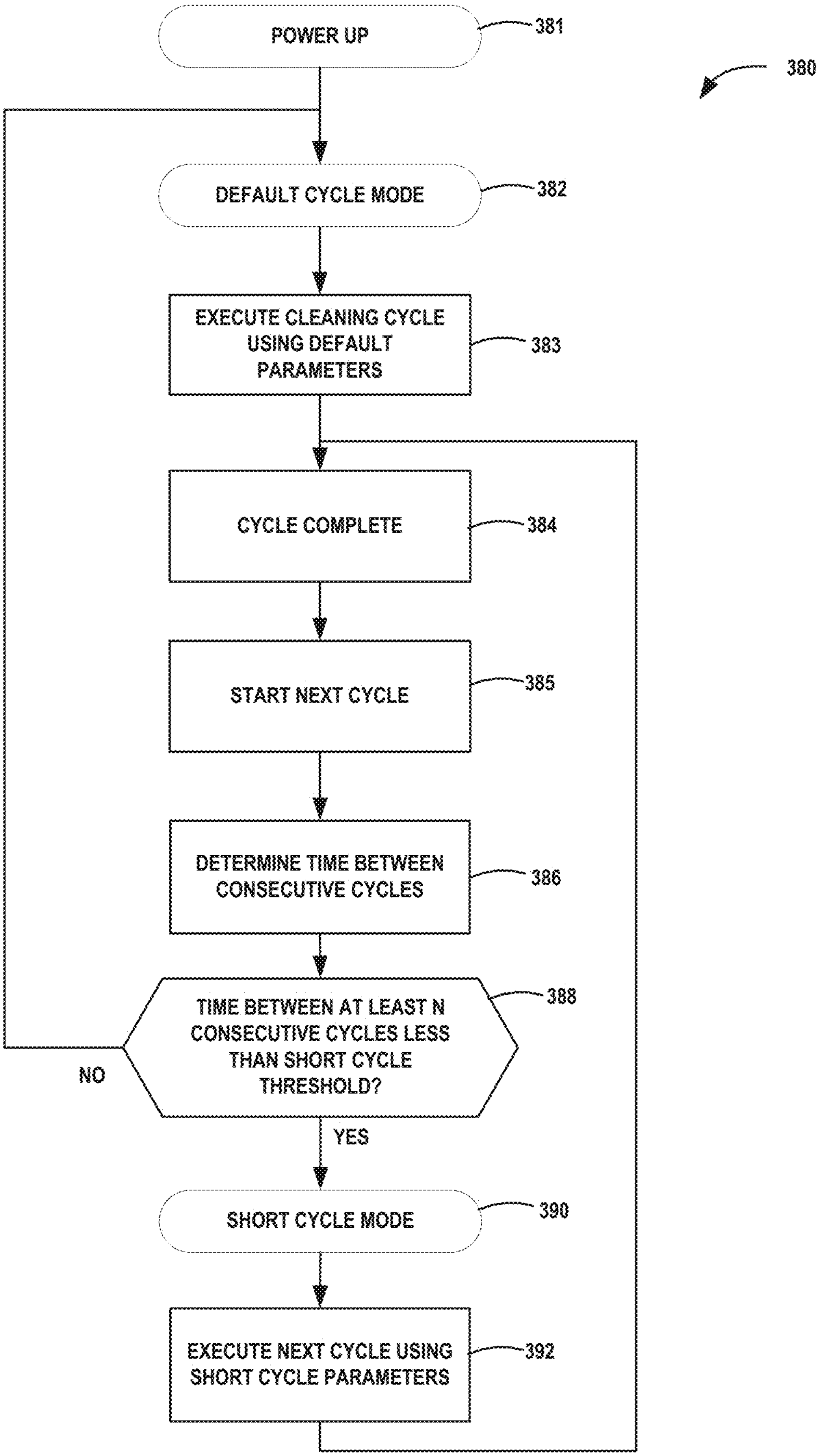
FIG. 13B is a flowchart illustrating an example process by which a computing device controls one or more cleaning cycles in a cleaning machine in either a default cycle mode or a short cycle mode based on a time between consecutive cleaning cycles.

FIG. 13B is a flowchart illustrating an example process (380) by which a computing device controls one or more cleaning cycles in a cleaning machine in either a default cycle mode or a short cycle mode based on a time between consecutive cleaning cycles. The computing device may include, for example, the example cleaning machine controller 200 of FIG. 2, and the process (380) may be controlled based on execution of instructions stored in cleaning process control module 212 and executed by processor(s) 202. In this example, the computing device controls operation of a cleaning machine based on the time duration between consecutive cleaning cycles. When a cleaning machine is experiencing high throughput, the time between the end of one cycle and the beginning of a second, consecutive cycle, can be relatively short (e.g., on the order of a few seconds for a dishmachine). In a door-type dishmachine, for example, the time between cycles may be determined in part by how fast an operator can open the door, input a new rack and close the door again (e.g., 2-3 seconds). If a minimum number of consecutive cycles (e.g., 3 or 4) have a short between-cycle time duration, this may indicate that a food establishment is experiencing a "busy" time and that a higher throughput would be beneficial. In such a situation, the computing device may switch to short cycle mode. When the time between consecutive cycles increases above the short cycle threshold, the cleaning machine may switch back to default mode.

Upon powering up (381), the computing device of the automated cleaning machine may automatically enter a default cycle mode (382). The computing device controls the cleaning machine to execute a cleaning cycle using default cleaning cycle parameters (383). The computing device detects (controls) when the cycle is complete (384) and detects (controls) the start of a consecutive cleaning cycle (385). The computing devices determines the time between the consecutive cleaning cycles (386). The computing device next determines whether the time durations between at least a predetermined number ("N") of consecutive cleaning cycles were less than a short cycle threshold (388). The short cycle threshold may be determined based on the type of cleaning machine and the amount of time between cleaning cycles indicative of high throughput. For a door-type dishmachine, for example, the short cycle threshold between cycle time duration may be on the order of a few seconds, such as less than 10 seconds or in some examples less than 2 or 3 seconds. The predetermined number of consecutive cleaning cycles may also be determined based on the type of cleaning machine and the number of consecutive cleaning cycles indicative of high throughput. For a door-type dishmachine, for example, the predetermined number of consecutive cleaning cycles may be 3 or 4 consecutive cleaning cycles.

If the time durations between the predetermined number of consecutive cleaning cycles do not satisfy the short cycle threshold (NO branch of 388), the computing device remains in default mode (382). If the time durations between the predetermined number of consecutive cleaning cycles satisfy the short cycle threshold (YES branch of 388), the computing device switches to short cycle mode (390). The computing device controls execution of the next consecutive cleaning cycle using short cycle cleaning process parameters (392). The computing device continues to monitor the time duration between each consecutive cleaning cycle (384, 385, 386, 388). If at any time the time durations between the predetermined number of consecutive cleaning cycles do not satisfy the short cycle threshold (NO branch of 388), the computing device returns to default mode (382).

The flowcharts of FIGS. 11, 12, 13A and 13B illustrate examples processes by which a computing device may control one or more cleaning cycles in a cleaning machine in either a default cycle mode or a short cycle mode in accordance with the present disclosure. It shall be understood, however, that the processes shown in FIGS. 11,12, 13A and 13B may be implemented either alone or in one or more combinations, and that the disclosure is not limited in this respect. For example, if a cleaning machine is programmed to execute short cleaning cycles during one or more predetermined time periods, but the number of cleaning cycles executed during that predetermined time, or the time(s) between two or more consecutive cleaning cycles, does not satisfy a corresponding short cycle threshold, the cleaning machine may return to default mode during that predetermined time period. As another example, a cleaning machine may include one or more short cycle modes (e.g., short cycle mode 1, short cycle mode 2, short cycle mode 3, etc.), each with its own short cycle cleaning parameters, including cleaning cycle duration, wash temperature, rinse temperature, product amount, etc. The particular short cycle may be selected depending upon the desired throughput of the cleaning machine, the number of cleaning cycles per unit time during a preceding time period, and/or the time(s) between two or more consecutive cleaning cycles.

As another example, short cycle mode may also be used to adjust the cycle parameters to account for a low product condition. In this example, if a low product or out of product condition is detected, the cleaning machine may switch to a short cycle mode in which the temperature is increased to compensate for the low amount of product remaining.

Figure 14:
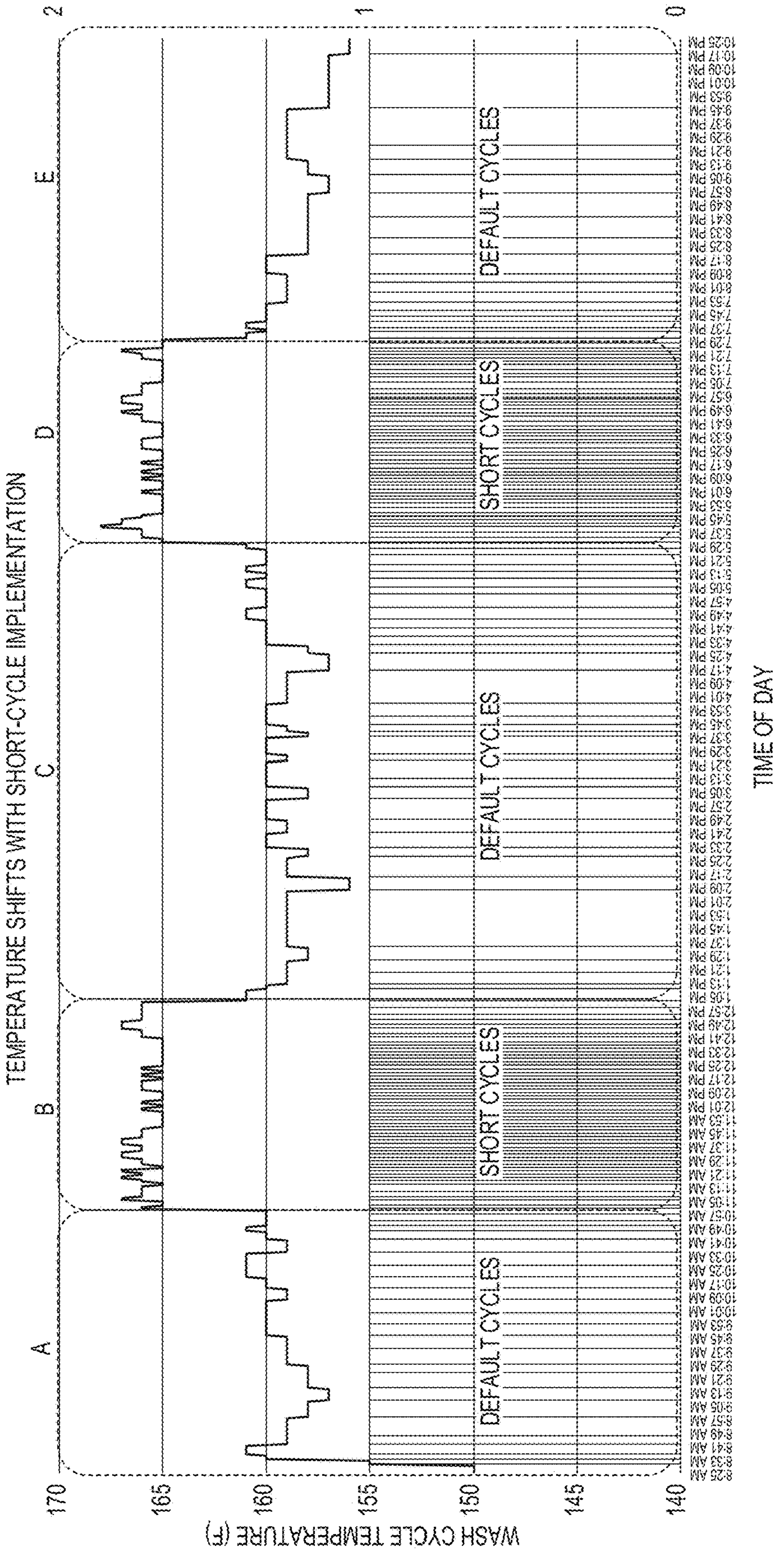
FIG. 14 is a graph showing example temperature parameter shifts throughout a day for a dishmachine capable of implementing short cleaning cycles in accordance with the present disclosure.

FIG. 14 is a graph showing example temperature shifts versus time throughout a day for a dishmachine that implements short cleaning cycles in accordance with the present disclosure. The data of FIG. 14 is representative of the number of dishmachine cycles executed per unit time for an example restaurant having increased traffic at lunch and dinner times, during which short cleaning cycles are enabled to increase throughput of the dishmachine. The throughput of the machine is indicated in the lower section of the graph, where each vertical line corresponds to a cleaning cycle executed by the dishmachine.

In FIG. 14, short cycles have been implemented during time period B (corresponding to a lunch time of between 11:00 am and 1:00 pm) and then again during time period D (corresponding to a dinner time of between 5:30 pm and 7:30 pm). Default cycles are implemented during time periods A (before 11:00 am), C (between 1:00 μm and 5:30 pm), and E (after 7:30 pm). During time period A, the machine is running in default cycle mode using a default temperature of about 160 F. At 11:00 am, the machine switches to short cycle mode, during which the wash cycle duration is reduced, thus increasing the throughput of the machine during time period B as indicated by the increase in the number of cycles per unit time during this time period. During this time, the wash temperature is increased from the default temperature of 160 F to a short cleaning cycle temperature of 166 F to ensure adequate cleaning and sanitization due to the shortened duration of the short cleaning cycle.

At 1:00 pm the machine switches back to default cycle mode, during which the wash cycle duration is increased and the wash temperature is reduced to 160 F, thus reducing the throughput of the machine during time period C as indicated in the lower portion of the graph. At 5:30 pm, the machine switches to short cycle mode once again, decreasing the duration of the wash cycle so as to increase the throughput of the machine during time period D as indicated by the increase in the number of cycles per unit time during this time period. During this time, the wash temperature is increased from the default temperature of 160 F to a short cleaning cycle temperature of 166 F to ensure adequate cleaning and sanitization due to the shortened duration of the short cleaning cycle. Finally, at 7:30 pm, the machine switches back to default cycle mode, during which the wash cycle duration is increased and the wash temperature is reduced back to 160 F, thus reducing the throughput of the machine during time period E.

Figure 15:
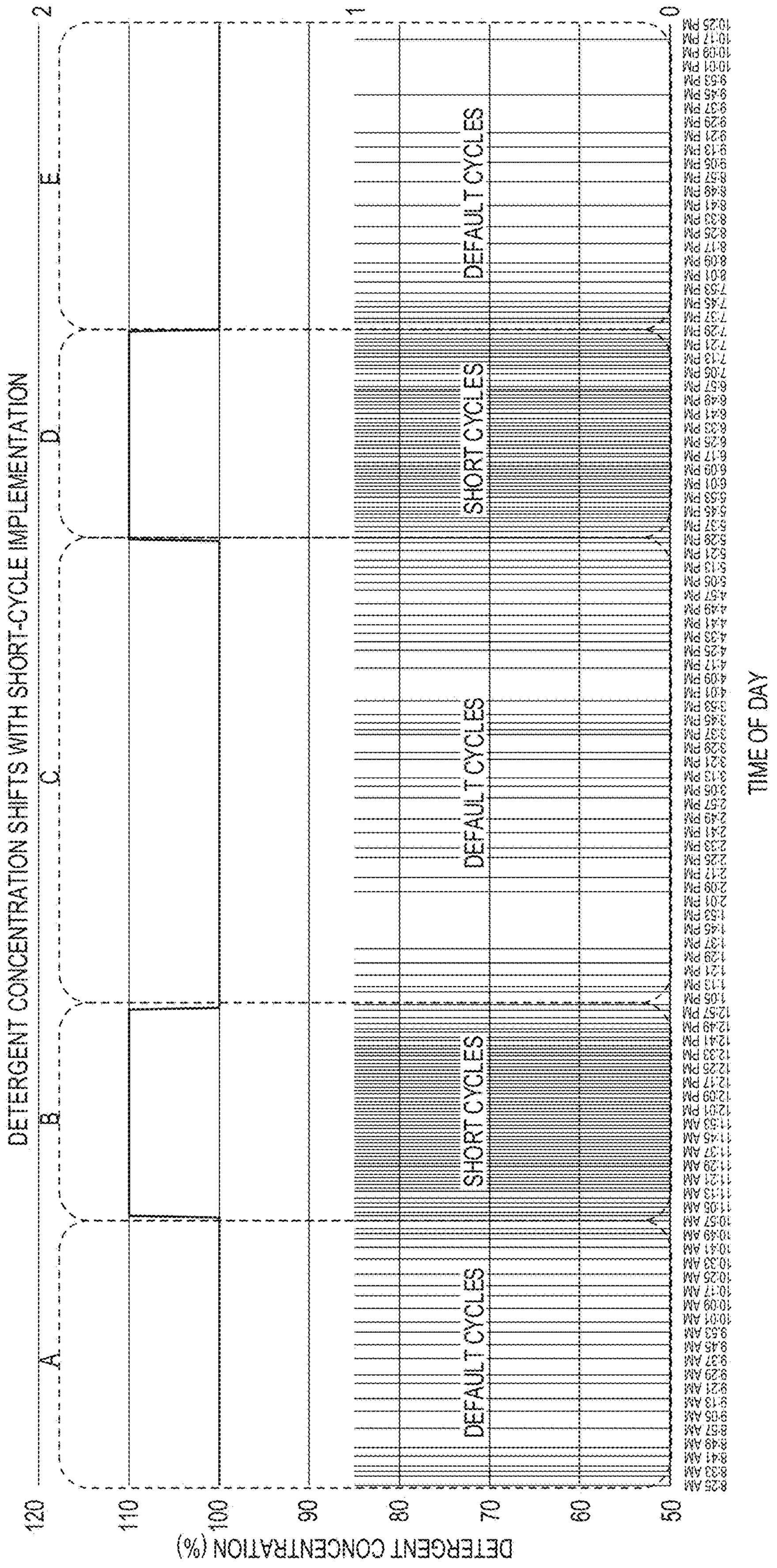
FIG. 15 is a graph showing example detergent concentration parameter shifts throughout a day for a dishmachine capable of implementing short cleaning cycles in accordance with the present disclosure.

FIG. 15 is a graph showing example detergent concentration parameter shifts versus time throughout a day for a dishmachine that implements short cleaning cycles in accordance with the present disclosure. The data of FIG. 15 is representative of the number of dishmachine cycles executed per unit time for an example restaurant having increased traffic at lunch and dinner times, during which short cleaning cycles are enabled to increase throughput of the dishmachine. As with FIG. 14, the throughput of the machine is indicated in the lower section of the graph, where each vertical line corresponds to a cleaning cycle executed by the dishmachine.

In FIG. 15, short cycles have again been implemented during time period B (corresponding to a lunch time of between 11:00 am and 1:00 pm) and then again during time period D (corresponding to a dinner time of between 5:30 pm and 7:30 pm). Default cycles are implemented during time periods A (before 11:00 am), C (between 1:00 μm and 5:30 pm), and E (after 7:30 pm). During time period A, the machine is running in default cycle mode using 100% of a default detergent concentration. At 11:00 am, the machine switches to short cycle mode, during which the wash cycle duration is reduced, thus increasing the throughput of the machine during time period B as indicated by the increase in the number of cycles per unit time during this time period. During this time, the detergent concentration is increased by 10% from 100% of the default detergent concentration to 110% of the default detergent concentration to ensure adequate cleaning and sanitization during the short cleaning cycle.

At 1:00 pm the machine switches back to default cycle mode, during which the wash cycle duration is increased back to the duration established by the default cycle duration parameter and the detergent concentration is reduced back to 100% of the default parameter, thus reducing the throughput of the machine during time period C as indicated in the lower portion of the graph. At 5:30 pm, the machine switches to short cycle mode once again, decreasing the duration of the wash cycle so as to increase the throughput of the machine during time period D as indicated by the increase in the number of cycles per unit time during this time period. During this time, the detergent concentration is increased by 10% to 110% of the default detergent concentration to ensure adequate cleaning and sanitization due to the shortened duration of the cleaning cycles during time period D. Finally, at 7:30 pm, the machine switches back to default cycle mode, during which the wash cycle duration is increased and the detergent concentration is reduced back to 100% of the default detergent concentration, thus reducing the throughput of the machine during time period E.

Figure 16:
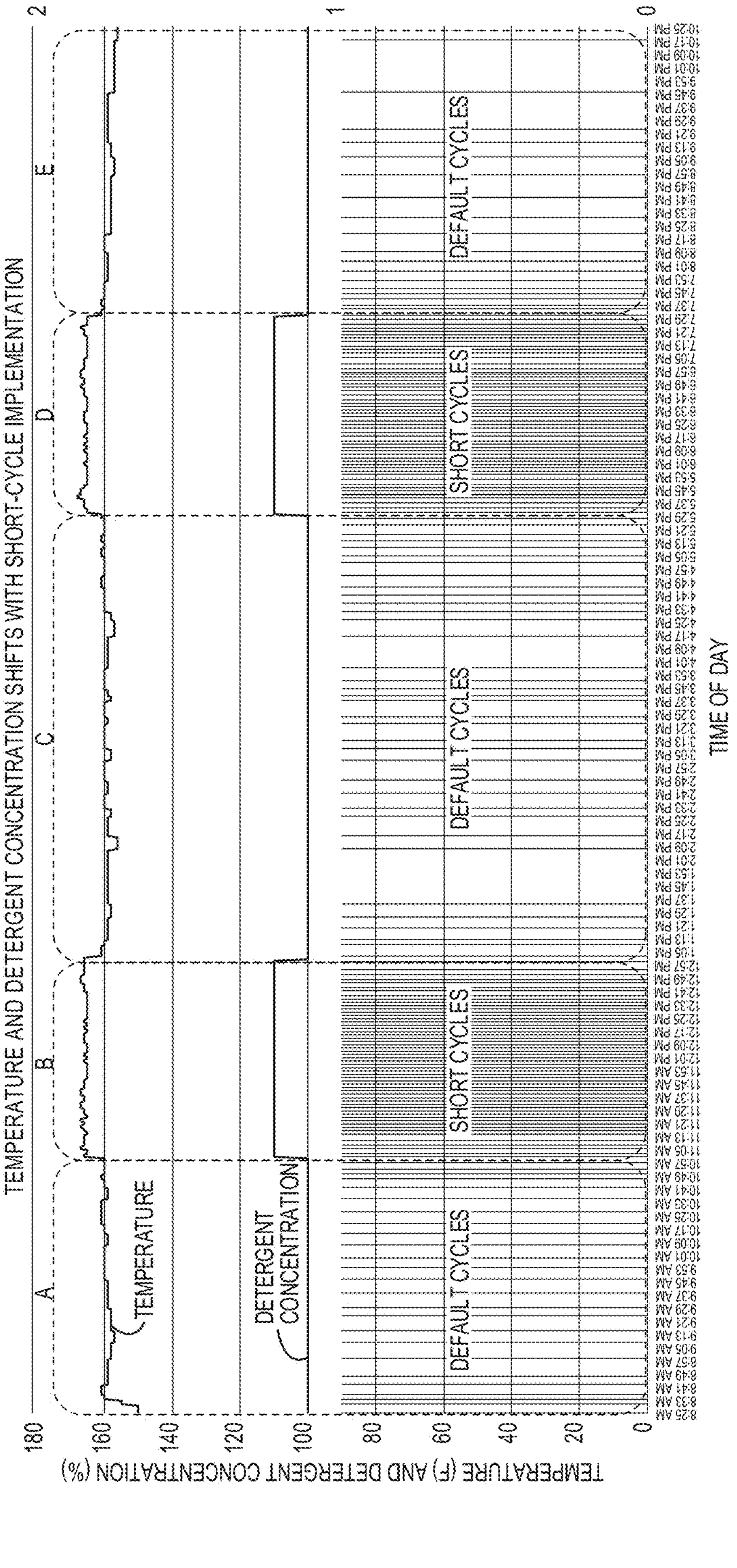
FIG. 16 is a graph showing example temperature and detergent concentration parameter shifts (both parameters adjusted at the same time) throughout a day for a dishmachine capable of implementing short cleaning cycles in accordance with the present disclosure.

FIG. 16 is a graph showing an example of how both temperature and detergent concentration parameters may be shifted in order to implement short cleaning cycles in a dishmachine in accordance with the present disclosure. The data of FIG. 16 is representative of the number of dishmachine cycles executed per unit time for an example restaurant having increased traffic at lunch and dinner times, during which short cleaning cycles are enabled to increase throughput of the dishmachine. The throughput of the machine is indicated in the lower section of the graph, where each vertical line corresponds to a cleaning cycle executed by the dishmachine.

In FIG. 16, short cycles have been implemented during time period B (corresponding to a lunch time of between 11:00 am and 1:00 pm) and then again during time period D (corresponding to a dinner time of between 5:30 pm and 7:30 pm). Default cycles are implemented during time periods A (before 11:00 am), C (between 1:00 μm and 5:30 pm), and E (after 7:30 pm). During time period A, the machine is running in default cycle mode using a default temperature of about 160 F and 100% of the default detergent concentration. At 11:00 am, the machine switches to short cycle mode, during which the wash cycle duration is reduced, thus increasing the throughput of the machine during time period B as indicated by the increase in the number of cycles per unit time during this time period. During this time, the detergent concentration is increased to 110% of the default detergent concentration and the wash temperature is increased from the default temperature of 160 F to a short cleaning cycle temperature of about 167 F to ensure adequate cleaning and sanitization due to the shortened duration of the short cleaning cycle.

At 1:00 pm the machine switches back to default cycle mode, during which the wash cycle duration is increased, thus reducing the throughput of the machine during time period C as indicated in the lower portion of the graph. In addition, the wash temperature is reduced to 160 F and the detergent concentration is reduced to 100 of the default detergent concentration. At 5:30 pm, the machine switches to short cycle mode once again, decreasing the duration of the wash cycle so as to increasing the throughput of the machine during time period D as indicated by the increase in the number of cycles per unit time during this time period. In addition, the wash temperature is increased from the default temperature of 160 F to a short cleaning cycle temperature of 167 F and the detergent concentration is increased to 100% of the default detergent concentration to ensure adequate cleaning and sanitization due to the shortened duration of the short cleaning cycle. Finally, at 7:30 pm, the machine switches back to default cycle mode, during which the wash cycle duration is increased, thus reducing the throughput of the machine during time period E. Also, the wash temperature is reduced to 160 F and the detergent concentration is reduced to 100% of the default detergent concentration.

Figure 17A:
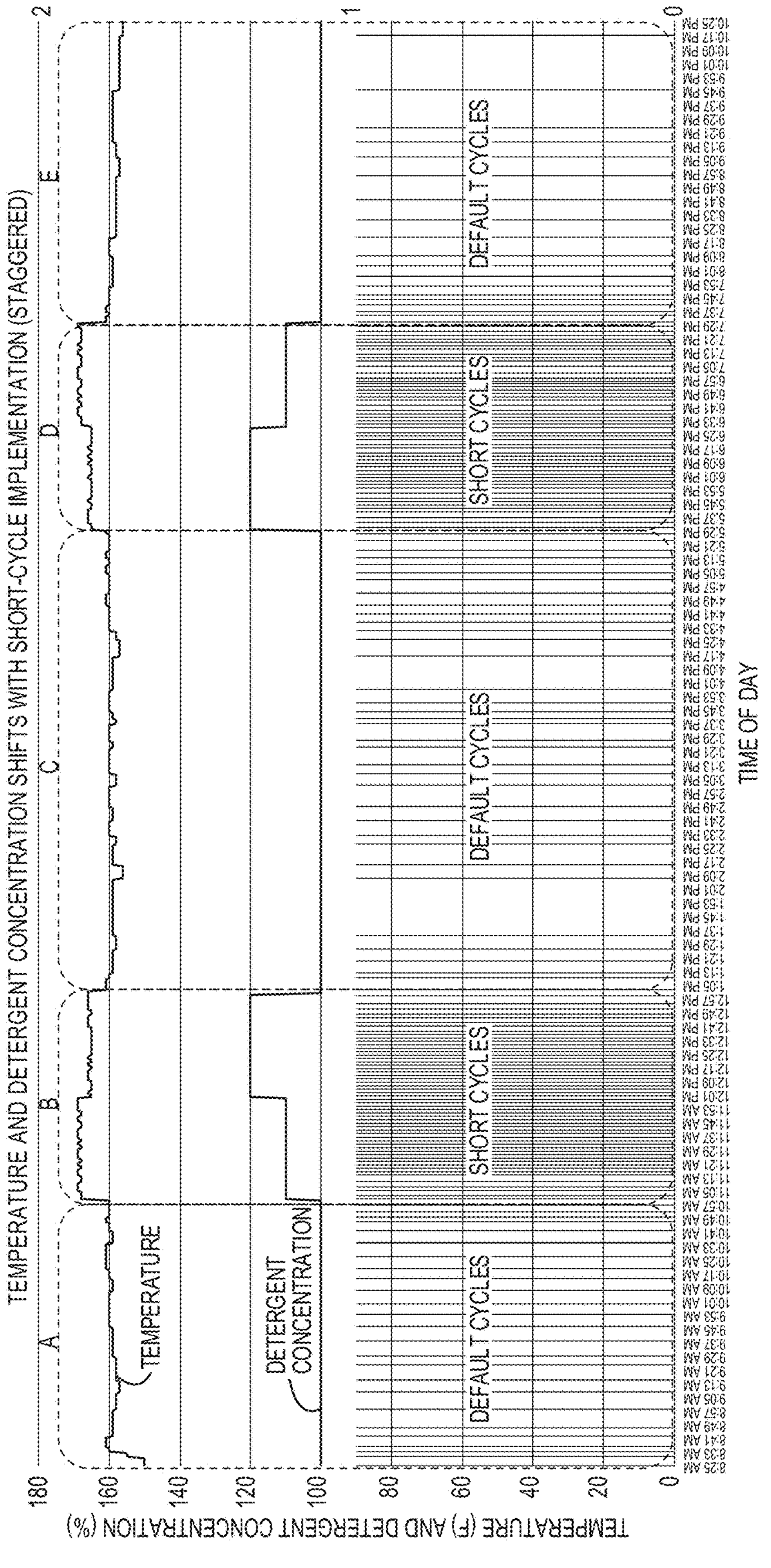
FIG. 17A is a graph showing example staggered temperature and detergent concentration parameter shifts throughout a day for a dishmachine capable of implementing short cleaning cycles in accordance with the present disclosure.

FIG. 17A is a graph showing another example of how both temperature and detergent concentration parameter may be shifted in order to implement short cleaning cycles in a dishmachine in accordance with the present disclosure. As with FIGS. 14-16, the data of FIG. 17A is representative of the number of dishmachine cycles executed per unit time for an example restaurant having increased traffic at lunch and dinner times, during which short cleaning cycles are enabled to increase throughput of the dishmachine. The throughput of the machine is indicated in the lower section of the graph, where each vertical line corresponds to a cleaning cycle executed by the dishmachine.

In FIG. 17A, short cycles have been implemented during time period B (corresponding to a lunch time of between 11:00 am and 1:00 pm) and then again during time period D (corresponding to a dinner time of between 5:30 pm and 7:30 pm). Default cycles are implemented during time periods A (before 11:00 am), C (between 1:00 μm and 5:30 pm), and E (after 7:30 pm). During time period A, the machine is running in default cycle mode using a default temperature of about 160 F and 100% of the default detergent concentration. At 11:00 am, the machine switches to short cycle mode, during which the wash cycle duration is reduced, thus increasing the throughput of the machine during time period B as indicated by the increase in the number of cycles per unit time during this time period. During this time, the detergent concentration is increased first to 110% of the default detergent concentration and then later to 120% of the default detergent concentration. Also, the machine temperature is increased from the default temperature of 160 F to a short cleaning cycle temperature of about 170 F and then later to about 165 F to ensure adequate cleaning and sanitization due to the shortened duration of the short cleaning cycle.

At 1:00 pm the machine switches back to default cycle mode, during which the wash cycle duration is increased, thus reducing the throughput of the machine during time period C as indicated in the lower portion of the graph. In addition, the wash temperature is reduced to 160 F and the detergent concentration is reduced to 100 of the default detergent concentration. At 5:30 pm, the machine switches to short cycle mode once again, decreasing the duration of the wash cycle so as to increasing the throughput of the machine during time period D as indicated by the increase in the number of cycles per unit time during this time period. In addition, the detergent concentration is increased to 120% of the default detergent concentration and then later to 110% of the default detergent concentration. Also, during time period D, the wash temperature is first increased from the default temperature of 160 F to a short cleaning cycle temperature of 165 F and then later increased again to a short cycle cleaning cycle temperature of 170 F.

Finally, at 7:30 pm, the machine switches back to default cycle mode, during which the wash cycle duration is increased, thus reducing the throughput of the machine during time period E. Also, the wash temperature is reduced to 160 F and the detergent concentration is reduced to 100% of the default detergent concentration.

Figure 17B:
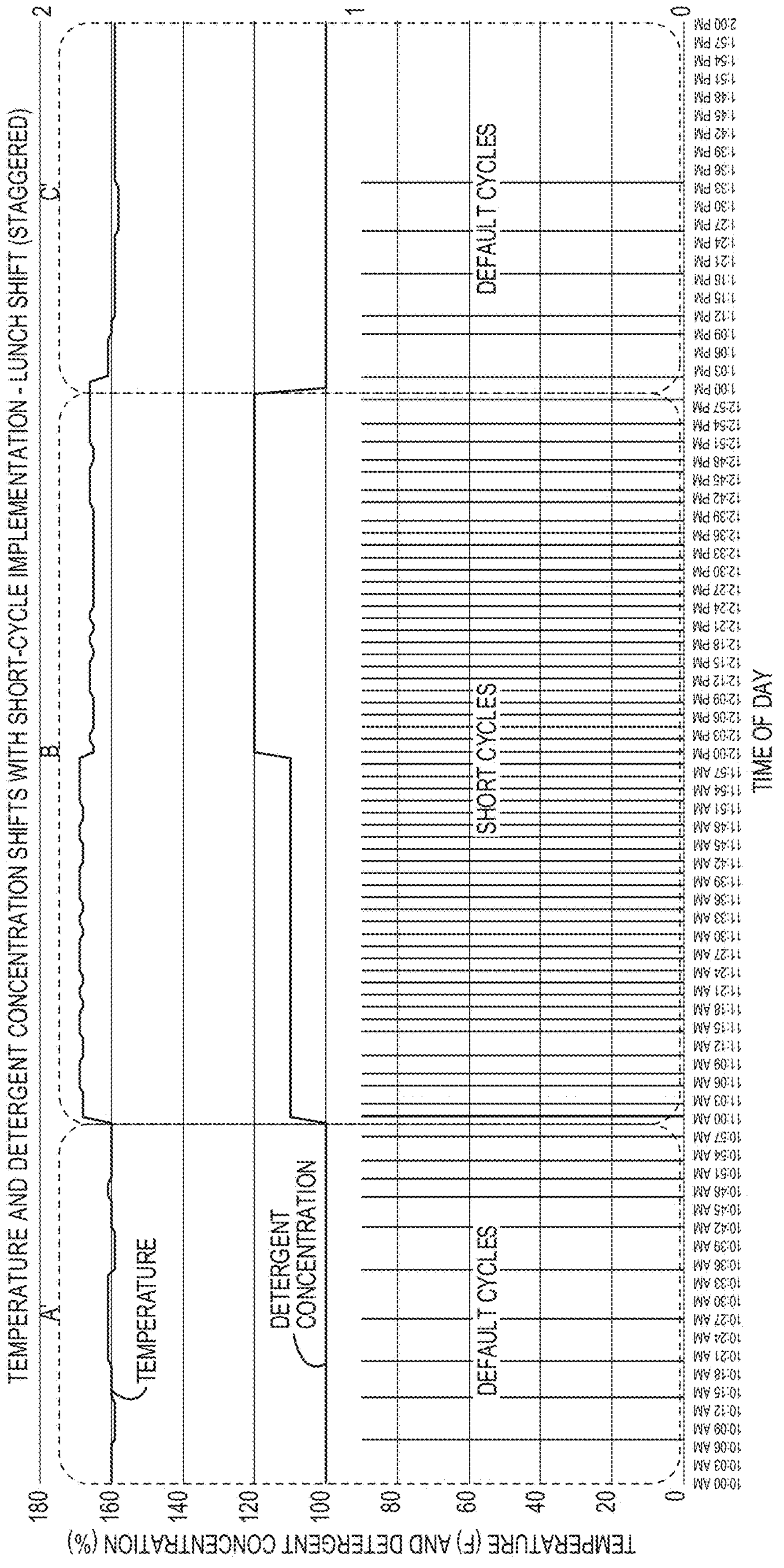
FIG. 17B is a graph showing the data of FIG. 17A for the 10:00 AM to 2:00 PM time period.

FIG. 17B is a graph showing the data of FIG. 17A for the 10:00 AM to 2:00 PM time period. During time period A' the machine is in default cycle mode, during time period B the machine is in short cycle mode, and during time C' the machine is in default cycle mode. FIG. 17B illustrates how the throughput of the dishmachine is increased when short cycle modes are implemented. This is illustrated by the increase in the number of cycles per unit time during time period B as compared to time periods A' and C'.

The examples of FIGS. 17A and 17B illustrate that various combinations of increased temperature and detergent concentrations may be implemented during a short-cycle period. For example, the shortened cycle increases to 120% detergent concentration, the temperature may not need to increase high as 170 F, so the temperature can be backed down to 165 F to save energy. Similarly, if the short cycle temperature is at 170 F, then the detergent concentration may only need to be increased by 110% to achieve adequate cleaning and sanitization. A combination of temperature and detergent concentration increases may be useful in accounts with poor procedures and/or high food soil amounts accumulating in their sump.

The examples described herein illustrate that implementation of shortened cleaning cycles in which the duration of the cleaning cycle is relatively shorter than a default cleaning cycle may help to increase throughput of an automated cleaning machine, while adjusting other cleaning process parameters, such as wash temperature and/or detergent concentration, to ensure that the wares subjected to the short cleaning process are adequately cleaned and/or sanitized. The short cleaning cycles may thus be useful during busy, high volume periods at restaurant or other food preparation or service location so that more cycles may be executed per unit time, while simultaneously ensuring a satisfactory cleaning and/or sanitizing result. In addition, in some examples, by implementing shortened cleaning cycles during high volume periods when increased throughput is desired or helpful, the short cleaning cycle enabled cleaning machines may still obtain energy and/or cost savings by remaining in default cycle mode, in which the cleaning process parameters are optimized for energy and or product usage, at other times when increased throughput is not wanted or needed.

Although the examples presented herein are described with respect to automated cleaning machines for use in food preparation/processing applications (e.g., dish machines or ware wash machines), it shall be understood that the cleaning process verification techniques described herein may be applied to a variety of other applications. Such applications may include, for example, food and/or beverage processing equipment, laundry applications, agricultural applications, hospitality applications, and/or any other application in which cleaning, disinfecting, or sanitizing of articles may be useful.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Examples

Example 1. An automated cleaning machine comprising at least one processor; at least one storage device that stores default cleaning cycle parameters and short cleaning cycle parameters, wherein the short cleaning cycle parameters include a total cycle duration that is relatively less than a total cycle duration of the default cleaning cycle; the at least one storage device further comprising instructions executable by the at least one processor to: control execution by the cleaning machine of at least one cleaning cycle using the default cleaning cycle parameters; determine a number of cleaning cycles executed during a predetermined period of time; compare the determined number of cleaning cycles to a predetermined short cycle threshold; in response to the determined number of cleaning cycles being greater than the predetermined short cycle threshold, control execution of at least one subsequent cleaning cycle using the short cycle cleaning process parameters.

Example 2. The automated cleaning machine of Example 1, wherein the one or more default cleaning cycle parameters include at least one of a default wash phase duration, a default rinse phase duration, a default detergent concentration, a default wash water temperature and a default rinse water temperature, the one or more short cleaning cycle parameters include at least one of a short cycle wash phase duration, a short cycle rinse phase duration, a short cycle detergent concentration, a short cycle wash water temperature and a short cycle rinse water temperature, and wherein the short cycle wash water temperature is relatively higher than the default wash water temperature.

Example 3. The automated cleaning machine of Example 2, wherein the short cycle detergent concentration is relatively higher than the default detergent concentration.

Example 4. The automated cleaning machine of Example 2, wherein the short cycle rinse water temperature is relatively higher than the default rinse water temperature.

Example 5. The automated cleaning machine of Example 2, wherein the short cycle wash phase duration is relatively less than the default wash phase duration.

Example 6. The automated cleaning machine of Example 2, wherein the short cycle wash phase duration and the short cycle wash water temperature are sufficient to transfer at least 3600 Heat Unit Equivalents (HUEs) to the articles in the wash chamber of the automated cleaning machine.

Example 7. The automated cleaning machine of Example 2, wherein the short cycle detergent concentration is relatively higher than the default detergent concentration, and wherein the short cycle wash phase duration, the short cycle wash water temperature, and the short cycle detergent concentration are sufficient to effectively clean the articles in the wash chamber of the automated cleaning machine.

Example 8. The automated cleaning machine of Example 1, the at least one storage device further comprising instructions executable by the at least one processor to: control execution of one or more cleaning cycles in the wash chamber of the cleaning machine in either a default cycle mode or a short cycle mode; in default cycle mode, control execution of at least one cleaning cycle in the wash chamber of the cleaning machine using the default cleaning cycle parameters; and in short cycle mode, control execution of at least one cleaning cycle in the wash chamber of the cleaning machine using the short cleaning cycle parameters.

Example 9. The automated cleaning machine of Example 1, the at least one storage device further comprising instructions executable by the at least one processor to: in response to the determined number of cleaning cycles being less than the predetermined short cycle threshold, control execution of at least one subsequent cleaning cycle using the default cycle cleaning process parameters.

Example 10. An automated cleaning machine comprising a wash chamber configured to receive one or more articles to be cleaned; a controller that controls execution of one or more cleaning cycles in the wash chamber of the cleaning machine in one of a default cycle mode or a short cycle mode, the controller comprising: at least one processor; at least one storage device that stores default cleaning cycle parameters associated with the default cycle mode and short cleaning cycle parameters associated with the short cycle mode, wherein the short cleaning cycle parameters include a total cycle duration that is less than a total cycle duration of the default cleaning cycle; the at least one storage device further comprising instructions executable by the at least one processor to: control execution by the cleaning machine of at least one cleaning cycle in default cycle mode using the default cleaning cycle parameters; determine a number of cleaning cycles executed during a predetermined period of time; compare the determined number of cleaning cycles to a predetermined short cycle threshold; in response to the determined number of cleaning cycles being greater than the predetermined short cycle threshold, control execution of at least one subsequent cleaning cycle in short cycle mode using the short cycle cleaning process parameters.

Example 11. An automated cleaning machine comprising: at least one processor; at least one storage device that stores default cleaning cycle parameters and short cleaning cycle parameters, wherein the short cleaning cycle parameters include a total cycle duration that is relatively less than a total cycle duration of the default cleaning cycle; the at least one storage device further comprising instructions executable by the at least one processor to: control execution by the cleaning machine of at least one cleaning cycle using the default cleaning cycle parameters; determine whether a current time of day is within a predetermined short cycle time period; in response to determining that the current time of day is within the predetermined short cycle time period, control execution of at least one subsequent cleaning cycle using the short cycle cleaning process parameters.

Example 12. The automated cleaning machine of Example 11, the at least one storage device further comprising instructions executable by the at least one processor to: determine a number of cleaning cycles executed using the short cleaning process parameters during a predetermined period of time; compare the determined number of cleaning cycles to a predetermined short cycle threshold; in response to the determined number of cleaning cycles being less than the predetermined short cycle threshold, control execution of at least one subsequent cleaning cycle using the default cycle cleaning process parameters.

Example 13. The automated cleaning machine of Example 11, wherein the one or more default cleaning cycle parameters include at least one of a default wash phase duration, a default rinse phase duration, a default detergent concentration, a default wash water temperature and a default rinse water temperature, the one or more short cleaning cycle parameters include at least one of a short cycle wash phase duration, a short cycle rinse phase duration, a short cycle detergent concentration, a short cycle wash water temperature and a short cycle rinse water temperature, and wherein the short cycle wash water temperature is relatively higher than the default wash water temperature.

Example 14. The automated cleaning machine of Example 13, wherein the short cycle detergent concentration is relatively higher than the default detergent concentration.

Example 15. The automated cleaning machine of Example 13, wherein the short cycle rinse water temperature is relatively higher than the default rinse water temperature.

Example 16. The automated cleaning machine of Example 13, wherein the short cycle wash phase duration is relatively less than the default wash phase duration.

Example 17. The automated cleaning machine of Example 13, wherein the short cycle wash phase duration and the short cycle wash water temperature are sufficient to transfer at least 3600 Heat Unit Equivalents (HUEs) to the articles in the wash chamber of the automated cleaning machine.

Example 18. The automated cleaning machine of Example 13, wherein the short cycle detergent concentration is relatively higher than the default detergent concentration, and wherein the short cycle wash phase duration, the short cycle wash water temperature, and the short cycle detergent concentration are sufficient to effectively clean the articles in the wash chamber of the automated cleaning machine.

Example 19. A method comprising storing default cleaning cycle parameters and short cleaning cycle parameters, wherein the short cleaning cycle parameters include a total cycle duration that is relatively less than a total cycle duration of the default cleaning cycle; controlling execution by a cleaning machine of at least one cleaning cycle using the default cleaning cycle parameters; determining a number of cleaning cycles executed during a predetermined period of time; comparing the determined number of cleaning cycles to a predetermined short cycle threshold; and in response to the determined number of cleaning cycles being greater than the predetermined short cycle threshold, controlling execution by the cleaning machine of at least one subsequent cleaning cycle using the short cycle cleaning process parameters.

Example 20. A method comprising storing default cleaning cycle parameters and short cleaning cycle parameters, wherein the short cleaning cycle parameters include a total cycle duration that is relatively less than a total cycle duration of the default cleaning cycle; controlling execution by a cleaning machine of at least one cleaning cycle using the default cleaning cycle parameters; determining whether a current time of day is within a predetermined short cycle time period; in response to determining that the current time of day is within the predetermined short cycle time period, controlling execution of at least one subsequent cleaning cycle using the short cycle cleaning process parameters.

Example 21. The method of Example 20, further comprising determining a number of cleaning cycles executed using the short cleaning process parameters during a predetermined period of time; comparing the determined number of cleaning cycles to a predetermined short cycle threshold; in response to the determined number of cleaning cycles being less than the predetermined short cycle threshold, controlling execution of at least one subsequent cleaning cycle using the default cycle cleaning process parameters.

Example 22. A method comprising storing default cleaning cycle parameters and short cleaning cycle parameters, wherein the short cleaning cycle parameters include a total cycle duration that is relatively less than a total cycle duration of the default cleaning cycle; controlling execution by a cleaning machine of at least one cleaning cycle using the default cleaning cycle parameters; determining a time duration between a plurality of consecutive cleaning cycles executed using the default cleaning cycle parameters; determining whether the time durations between at least a predetermined number of the consecutive cleaning cycles satisfied a short cycle threshold; and in response to determining that the time durations between at least the predetermined number of sequential cleaning cycles satisfied the short cycle threshold, controlling execution by the cleaning machine of at least one subsequent cleaning cycle using the short cycle cleaning process parameters.

Example 23. An automated cleaning machine comprising at least one processor; at least one storage device that stores default cleaning cycle parameters and short cleaning cycle parameters, wherein the short cleaning cycle parameters include a total cycle duration that is relatively less than a total cycle duration of the default cleaning cycle; the at least one storage device further comprising instructions executable by the at least one processor to: control execution by a cleaning machine of cleaning cycles using the default cleaning cycle parameters; determine a time duration between consecutive cleaning cycles executed using the default cleaning cycle parameters; determine whether time durations between at least a predetermined number of the consecutive cleaning cycles satisfies a short cycle threshold; and in response to determining that the time durations between at least the predetermined number of sequential cleaning cycles satisfied the short cycle threshold, control execution by the cleaning machine of at least one subsequent cleaning cycle using the short cycle cleaning process parameters.

Various examples have been described. These and other examples are within the scope of the following claims.

The invention claimed is:

1. An automated cleaning machine comprising:

a wash chamber configured to receive one or more articles to be cleaned, wherein the one or more articles are not component parts of the automated cleaning machine and are configured to be inserted and removed from the automated cleaning machine;

a controller comprising:

at least one processor; and at least one storage device that stores one or more default cleaning cycle parameters associated with a default cycle mode and one or more short cleaning cycles parameters associated with a short cycle mode, the at least one storage device further comprising instructions executable by the at least one processor to:

execute a first set of consecutive cleaning cycles using the one or more default cleaning cycle parameters to wash one or more first sets of the one or more articles;

determine first time durations between at least a first predetermined number of cleaning cycles in the first set of consecutive cleaning cycles;

determine that the first time durations satisfy a short cycle threshold;

in response to determining that the first time durations satisfy the short cycle threshold, execute at least one first subsequent cleaning cycle using the one or more short cleaning cycle parameters to wash a second set of the one or more articles;

execute a second set of consecutive cleaning cycles using the one or more short cleaning cycle parameters, wherein the second set of consecutive cleaning cycles includes a second predetermined number of cleaning cycles, wherein the second set of consecutive cleaning cycles includes the at least one first subsequent cleaning cycle, and wherein the cleaning cycles of the second set of consecutive cleaning cycles have shorter total cycle durations than the cleaning cycles of the first set of consecutive cleaning cycles;

determine second time durations, the second time durations being between cleaning cycles in the second set of consecutive cleaning cycles;

determine that the second time durations do not satisfy the short cycle threshold; and in response to determining that the second time durations do not satisfy the short cycle threshold, execute at least one second subsequent cleaning cycle using the one or more default cleaning cycle parameters to wash a third set of the one or more articles, wherein each cleaning cycle of the at least one second subsequent cleaning cycle has a longer total duration than each of the cleaning cycles of the second set of consecutive cleaning cycles.

2. The automated cleaning machine of claim 1, wherein the one or more default cleaning cycle parameters specify at least one of a default wash phase duration, a default rinse phase duration, a default detergent concentration, a default wash water temperature, or a default rinse water temperature, wherein the one or more short cleaning cycle parameters specify at least one of a short cycle wash phase duration, a short cycle rinse phase duration, a short cycle detergent concentration, a short cycle wash water temperature, or a short cycle rinse water temperature, and wherein the short cycle wash water temperature is relatively higher than the default wash water temperature.

3. The automated cleaning machine of claim 2, wherein the short cycle detergent concentration is relatively higher than the default detergent concentration, wherein the short cycle rinse water temperature is relatively higher than the default rinse water temperature, or wherein the short cycle wash phase duration is relatively less than the default wash phase duration.

4. The automated cleaning machine of claim 2, wherein the short cycle wash phase duration and the short cycle wash water temperature are sufficient to transfer at least 3600 Heat Unit Equivalents (HUEs) to articles in the wash chamber of the automated cleaning machine.

5. The automated cleaning machine of claim 1, wherein the first predetermined number of cleaning cycles is based on a type of the automated cleaning machine.

6. The automated cleaning machine of claim 1, wherein the short cycle threshold is based on a type of the automated cleaning machine.

7. A method comprising:

storing, in at least one storage device of an automated cleaning machine that has a wash chamber configured to receive one or more articles to be cleaned, one or more default cleaning cycle parameters associated with a default cycle mode and one or more short cycle cleaning cycle parameters associated with a short cycle mode, wherein the one or more articles are not component parts of the automated cleaning machine and are configured to be inserted and removed from the automated cleaning machine;

executing, by the automated cleaning machine, a first set of consecutive cleaning cycles using the one or more default cleaning cycle parameters to wash one or more first sets of the one or more articles;

determining, by a controller of the automated cleaning machine, first time durations between at least a first predetermined number of cleaning cycles in the first set of consecutive cleaning cycles;

determining, by the controller, that the first time durations satisfy a short cycle threshold; and in response to determining that the first time durations satisfy the short cycle threshold, executing, by the automated cleaning machine, at least one first subsequent cleaning cycle using the one or more short cleaning cycle parameters to wash a second set of the one or more articles;

executing, by the automated cleaning machine, a second set of consecutive cleaning cycles using the one or more short cleaning cycle parameters, wherein the second set of consecutive cleaning cycles includes the at least one first subsequent cleaning cycle, and wherein the cleaning cycles of the second set of consecutive cleaning cycles have shorter total cycle durations than the cleaning cycles of the first set of consecutive cleaning cycles;

determining, by the controller, second time durations, the second time durations being between at least a second predetermined number of cleaning cycles in the second set of consecutive cleaning cycles;

determining, by the controller, that the second time durations do not satisfy the short cycle threshold; and in response to determining that the second time durations do not satisfy the short cycle threshold, executing, by the automated cleaning machine, at least one second subsequent cleaning cycle using the one or more default cleaning cycle parameters to wash a third set of the one or more articles, wherein each cleaning cycle of the at least one second subsequent cleaning cycle has a longer total duration than each of the cleaning cycles of the second set of consecutive cleaning cycles.

8. The method of claim 7, wherein the one or more default cleaning cycle parameters specify at least one of a default wash phase duration, a default rinse phase duration, a default detergent concentration, a default wash water temperature, or a default rinse water temperature, wherein the one or more short cleaning cycle parameters specify at least one of a short cycle wash phase duration, a short cycle rinse phase duration, a short cycle detergent concentration, a short cycle wash water temperature, or a short cycle rinse water temperature, and wherein the short cycle wash water temperature is relatively higher than the default wash water temperature.

9. The method of claim 8, wherein the short cycle detergent concentration is relatively higher than the default detergent concentration, wherein the short cycle rinse water temperature is relatively higher than the default rinse water temperature, or wherein the short cycle wash phase duration is relatively less than the default wash phase duration.

10. The method of claim 8, wherein the short cycle wash phase duration and the short cycle wash water temperature are sufficient to transfer at least 3600 Heat Unit Equivalents (HUEs) to articles in the wash chamber of the automated cleaning machine.

11. The method of claim 7, wherein the first predetermined number of cleaning cycles is based on a type of the automated cleaning machine.

12. The method of claim 7, wherein the short cycle threshold is based on a type of the automated cleaning machine.

* * * * *